United States Patent [19]

Rasmussen

[11] 3,876,658
[45] Apr. 8, 1975

[54] B-OR₂-PHENETHYLIMINO-PYRROLIDINES
[75] Inventor: Chris Royce Rasmussen, Ambler, Pa.
[73] Assignee: McNeil Laboratories, Incorporated, Fort Washington, Pa.
[22] Filed: Oct. 5, 1973
[21] Appl. No.: 403,756

Related U.S. Application Data
[63] Continuation-in-part of Ser. No. 306,641, Nov. 15, 1972, abandoned, which is a continuation-in-part of Ser. No. 165,862, July 23, 1971, abandoned.

[52] U.S. Cl. ............... 260/326.5 D; 260/326.5 R; 260/326.5 A; 260/326.5 L; 260/570.8 R; 260/613 D; 424/274
[51] Int. Cl............................................ C07d 27/04
[58] Field of Search...260/326.5 R, 326.5 D, 326.5 L

[56] References Cited
UNITED STATES PATENTS
3,725,435  4/1973  Poos ........................... 260/326.5 D Primary Examiner—Joseph A. Narcavage
Attorney, Agent, or Firm—Salvatore R. Conte

[57] ABSTRACT

Compounds of the class of $\beta$-hydroxy-, $\beta$-alkenoxy-, $\beta$-cycloalkoxy- and $\beta$-alkoxy-phenethylimino-pyrrolidines useful for treatment of cardiovascular disease states.

25 Claims, No Drawings

β-OR₂-PHENETHYLIMINO-PYRROLIDINES

BACKGROUND OF THE INVENTION

The invention pertains to the field of substituted phenethylimino-pyrrolidines which demonstrate such pharmacological properties as ganglionic blocking-hypotensive, cardiac slowing, and cardiac atrial and ventricular antiarrhythmic activities, and are thus useful agents for the treatment of cardiovascular disease states. The subject pyrrolidines differ from those in the prior art by having, among other differences, a hydroxy, alkenoxy, cycloalkoxy or an alkoxy group (i.e., "OR₂") in the β-position of the phenethyl function. Prior art compounds are as described in Canadian Pat. No. 850,116.

DESCRIPTION OF THE PREFERRED EMBODIMENTS

The novel β-OR₂-phenethylimino-pyrrolidines of this invention may be structurally represented by the formula:

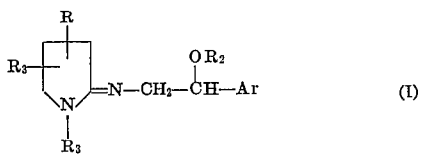

wherein:
Ar is a substituted phenyl selected from the group conconsisting of di-loweralkoxyphenyl, tri-loweralkoxyphenyl, loweralkyl-loweralkoxyphenyl, hydroxy-loweralkoxyphenyl, benzyloxy-loweralkoxyphenyl, di-halophenyl and methylenedioxyphenyl;

R is a member selected from the group consisting of hydrogen and alkyl having from 1 to 8 carbons, preferably methyl;

R₁ is a member selected from the group consisting of benzyl, loweralkyl, preferably methyl, and hydroxy-lower-alkyl, preferably hydroxyethyl; and R₂ is a member selected from the group consisting of hydrogen, loweralkenyl, preferably allyl, cycloalkyl, preferably cyclopentyl and cyclohexyl, and loweralkyl, preferably methyl and ethyl; and R₃ is a member selected from the group consisting of hydrogen and loweralkyl, preferably methyl;

provided that:
i. when R₁ is benzyl, then R₂ is loweralkyl and each of R and R₃ is hydrogen; and
ii. when Ar is hydroxy-loweralkoxyphenyl, then R₁ is loweralkyl.

The therapeutically active non-toxic acid addition salts of the foregoing pyrrolidines (I) are also embraced within the scope of this invention.

As used herein, "halo" represents chloro, bromo, iodo and fluoro, with chloro being preferred; "loweralkyl" and "loweralkoxy" may be straight or branch chained and have from 1 to 6 carbon atoms, such as, for example, methyl, ethyl, propyl, isopropyl, butyl, pentyl, hexyl and the like alkyls, and respectively, the corresponding alkoxys, such as methoxy, ethoxy, propoxy, isopropoxy, etc.; and "loweralkenyl" is an unsaturated (one double bond) hydrocarbon having from 3 to 6 carbon atoms, such as, for example, allyl, 3-butenyl, etc.

Among the preferred embodiments of this invention are those illustrated by the following formula:

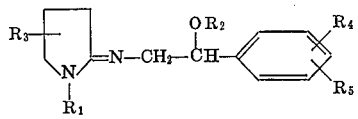

wherein R₁ is a member selected from the group consisting of loweralkyl and benzyl; R₂ is a member selected from the group consisting of hydrogen and loweralkyl; R₃ is a member selected from the group consisting of hydrogen and loweralkyl; and either of R₄ and R₅ is loweralkoxy, the other being a member selected from the group consisting of loweralkoxy, loweralkyl, hydroxy and benzyloxy. R₄ and R₅ may also be halo, or taken together may represent the methylenedioxy substituent attached to adjacent carbon atoms of the phenyl group. The designated substituents R₄ and R₅, except when each is halo, are preferably located in the 3- and 4-positions. When R₄ and R₅ are halo, the preferred locations are in the 2- and 6-positions. When R₃ is loweralkyl, it is preferably located in the 5-position of the pyrrolidine ring.

Due to the asymmetric β-carbon atom of the phenethyl function, it is evident that the existence of the formula (I) compounds in the form of stereochemical isomers (enantiomorphs) is possible. When R is alkyl and when R₃ is loweralkyl other asymmetric centers are introduced, except when R and R₃ are equal and occupy the same position, which affords additional sets of diastereoisomeric d,1-(enantiomeric) pairs. Thus by standard methods of resolution or synthesis the corresponding d,1-pairs or individual isomers may be obtained. Such pharmacologically active isomers are naturally intended to be included within the scope of this invention.

The compounds of formula (I) are generally prepared by reacting a fluoborate of formula (II) with a primary amine having the formula: $NH_2-CH_2-CH(OR_2)-Ar$ (III). Stoichiometric quantities of reactants are preferably employed. Suitable organic solvents for conducting the reaction include lower aliphatic alcohols, such as, for example, methanol, ethanol, 2-propanol, tert-butanol and the like; ethers, such as, for example, diethylether, tetrahydrofuran, dioxane and the like; lower halogenated hydrocarbons, such as, for example, chloroform, methylene chloride, 1,2-dichloroethane and the like; and aromatic hydrocarbons, such as, for example, benzene, toluene, xylene and the like. Ambient to 0°C temperatures may generally be employed. The resulting product (IV), in the form of the fluoborate salt, is converted to the corresponding base form (I) by conventional means, for example, by treatment with a suitable alkali such as alkali metal or alkaline earth metal hydroxides, carbonates and the like. The reaction may be illustrated as follows:

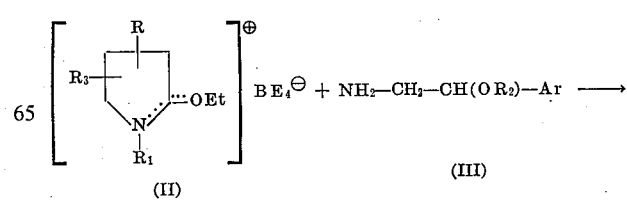

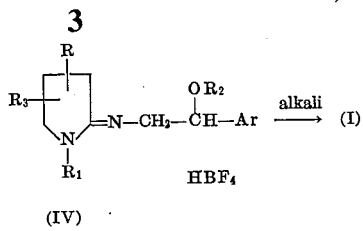

(IV)

Fluoborate salts of formula (II) have for the most part been described in the literature (see Canadian Pat. No. 850,116) and may be prepared according to Ber., 89,2060 (1956) by treating an appropriate pyrrolidin-2-one with triethyloxonium fluoborate [also see Meerwein, et al., Annalen der Chemie, 641: 1–39 (March) 1961]:

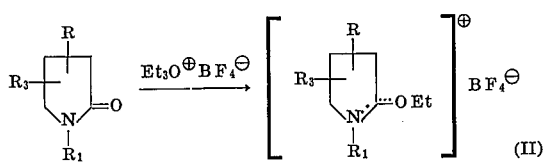

The amino-ethers of formula (III), i.e., wherein $R_2$ is alkoxy, cycloalkoxy or alkenoxy may be obtained from the nitrostyrenes of formula (VI) which are generally known in the literature and may be prepared according to the directions described by A. Dornow, et al., Arch. Pharm., 284, 153–60 (1951). The formula (VI) nitrostyrene is converted to the nitro-ether (VII), wherein "alk" represents the loweralkyl, cycloalkyl and loweralkenyl functions of $R_2$, according to the directions described by M. G. Tsatsas, Bull, Soc. Chim. France, 884 (1949), i.e., by treatment with excess alkali "alk"-oxide in a suitable organic solvent such as a lower alkanol, for example, sodium methoxide in methanol, sodium ethoxide in ethanol, and the like, or in an ether, for example sodium cyclohexyloxide in tetrahydrofuran, sodium allyloxide in dioxane, and the like. The reaction is conducted under an inert atomsphere, such as nitrogen, helium, argon and the like, and at temperatures below 0°C, preferably between –10° to 0°C. After reaction is complete, the excess alkoxide is neutralized by quenching the reaction mixture with a slight excess of acetic acid. The nitro function of (VII) is then reduced, for example, by means of lithium aluminum hydride or by catalytic hydrogenation, e.g., hydrogen over Raney nickel, to yield the desired aminoether of formula (III-a). The foregoing reactions may be illustrated by the following diagram:

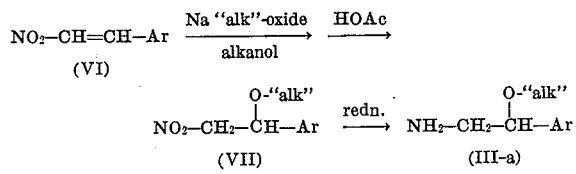

The amino-alcohols of formula (III), i.e., where $R_2$ is hydrogen, may be obtained by treating a formula (V) araldehyde with a slight stoichiometric excess of nitromethane and a slight stoichiometric excess of alkali, such as potassium or sodium hydroxide, preferably the former, in an aqueous alkanol solvent at temperatures of about –20° to 0°C. After the reaction is complete, the excess alkali is neutralized by quenching the reaction mixture with a slight excess of acetic acid and the nitro-function of the thus-obtained nitro-alcohol (VIII) is reduced, for example, by means of catalytic hydrogenation, e.g., hydrogen over Raney nickel, to yield the desired aminoalcohol of formula (III-b). The reaction scheme is illustrated as follows:

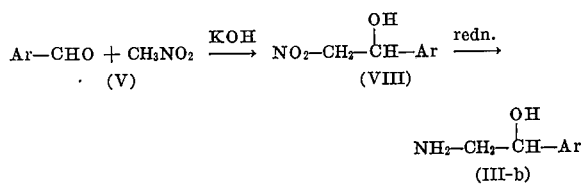

$$NH_2-CH_2-\underset{|}{\overset{OH}{C}}H-Ar$$
(III-b)

The subject compounds of formula (I) in which Ar is hydroxy-loweralkoxyphenyl are preferably prepared from the corresponding compounds wherein Ar is benzyloxyloweralkoxyphenyl, for example, by standard debenzylation procedures such as by means of catalytic hydrogenation, thereby transforming the benzyloxy function to a hydroxy function.

The formula (I) bases are convertible to therapeutically active non-toxic acid addition salts by treatment with an appropriate acid, such as, for example, an inorganic acid, such as, a hydrohalic acid, e.g., hydrochloric, hydrobromic or hydroiodic acid, and sulfuric acid, nitric acid, phosphoric acid and the like; or an organic acid, such as, acetic, propionic, glycolic lactic pyruvic, malonic, succinic, maleic, fumaric, malic, tartaric, citric, benzoic, cinnamic, mandelic, methanesulfonic, ethanesulfonic, hydroxyethanesulfonic, benzenesulfonic, p-toluenesulfonic, cyclohexanesulfamic, salicyclic, p-aminosalicylic, 2-phenoxybenzoic, 2-acetoxybenzoic and the like acids. Conversely, the salt form can be converted by treatment with alkali into the free base form.

The compounds of this invention have been found to be useful agents for the treatment of cardiovascular disease states such as hypertension, angina pectoris, and atrial and/or ventricular arrhythmias by virtue of their activity in experimental laboratory animals at total doses of 2.5–17.5 mg/kg i.v. in one or more of the following tests.

Test A. Ganglionic Blocking Activity (Antihypertensive): The methodology followed is that reported by G. H. Acheson and S. A. Pereira, J. Pharmacol and Exper. Therap. 87, 273 (1946) on anesthetized cats. According to this test, blockade of pre-ganglionic stimulation of the nictitating membrane of the anesthetized cat without affecting the post-ganglionic stimulation constitutes ganglionicblocking activity.

Test B. Reflexogenic Sinus Tachycardia (Cardiacslowing): A bilateral vagotomy is performed on the anesthetized dog [anesthesia consists of i.v. administration of thiopental sodium (20 mg/kg) maintained by subsequent i.v. injections of α-chloralose (60 mg/kg)]. Two doses of aminophylline (5 mg/kg i.v.) are administered at 15-minute intervals. The hypotensive effect of aminophylline activates the baro-receptors of the carotid sinus which, in turn, stimulates the sympathetic nervous system causing a reflex rise in the heart rate. Fifteen minutes after the second dose of aminophylline, the compound to be tested is administered i.v. and the effect on the heart rate is noted over a 30-minutes period. Compounds showing heart-rate lowering activity of at least 18 sinus beats per minute for at least 5 minutes are considered to be active. Such compounds are useful in the treatment of angina pectoris since heart rate is considered to be a major determinant of myocardial oxygen consumption.

Text C. Ventricular Anti-arrhythmic Activity is evaluated by either of the following two tests.

Test C-1. Mongrel dogs are anesthetized with pentobarbital sodium (30 mg/kg) i.v. A left-sided thoracotomy is performed and the left anterior descending coronary artery is ligated according to the procedure of S.A. Harris, Circ. 1, 1318 (1950). Eighteen to 24 hours later, the animal recovers from the anesthesia and a full blown multifocal ventricular tachycardia develops. The test compound is then administered i.v. and the effect on the arrhythmia is noted. The degree of protection is determined by expressing the ratio of normal sinus beats to heart rate as a percentage. At least a 25% reversion to normal sinus rhythm lasting at least 15 minutes indicates positive ventricular anti-arrhythmic activity.

Test C-2. A cuabain-induced ventricular anti-arrhythic test: Limb lead II of the electrocardiogram and arterial blood pressure recordings on the anesthetized dog (anesthesia same as in Test B) are first obtained. Ovabain (70mcg/kg i.v.) is given and readministered at 15-minute intervals in 10 mcg/kg increments until a ventricular tachycardia is sustained for 10 minutes. The test compound is then administered i.v. Effectiveness is assessed by the ability of the drug to revert the tachycardia to normal sinus rhythm.

Test D. Atrial Anti-arrhythmic Test: The right atrium of an anesthetized dog (anesthesia same as in Test B) is exposed by right thoracotomy and retraction of the pericardium. Atrial fibrillation, as determined by standard ECG limb lead (II), is induced by placing two drops of a 10% solution of acetylcholine on the atrium and then stroking the atrium with a blunt spatula. The period of fibrillation is recorded. Two control periods of fibrillation are produced at 15 -minute intervals. The compound to be tested is administered i.v. 10 seconds after the next induction. A compound is classified as active if it decreases the period of fibrillation by at least 50%. The minimum dose which causes such 50% decrease is called the minimum effective dose (MED).

In the following table, the activity of several of the subject compounds is listed, as demonstrated by their relative positive responses to one or more of the aforementioned at a total dose of 2.5–17.5 mg/kg i.v. It is understood that the compounds listed therein are not stated for purpose of limiting the invention thereto, but only to show the useful properties of all the compounds within the scope of formula (I) in base or salt form.

| Compound of Example No. | Active in Test(s) | Compound of Example No. | Active in Test(s) |
|---|---|---|---|
| I | B, C-2 | XXIII-C | B, C-2, D |
| II | A, D | XXIV-D | C-2, D |
| III | B | XXV-A | B, C-2, D |
| IV | B, C-1, D | XXV-B | C-2, D |
| V | B, C-1, D | XXVI | B, C-2, D |
| VI | D | XXVII-D | B, C-2, D |
| XVI | B | XXVIII-D | B, D |
| XVIII | B, D | XXIX-D | B, C-2, D |
| XVIII | B, C-2, D | XXX | B, D |
| XX | B, D | XXXI-D | C-2, D |
| XXI | B, D | XXIV-C | A, B, C-1, D |
| XXII-C | B, C-2, D | | |

The subject compounds (I), in base or acid addition salt form, may be formulated into conventional pharmaceutical dosage forms and preparations, for example, for oral and parenteral administration, according to standard pharmaceutical techniques in the art.

The following examples are intended to illustrate, but not to limit, the scope of the present invention.

EXAMPLE I 2-(3,4-Dimethoxy-$\beta$-methoxyphenethyl)imino-1-methyl-pyrrolidine fumarate:

A suspension of triethyloxonium fluoroborate in ether is prepared from 12.78 g. (0.09 mole) of boron trifluoride etherate and 6.68 g. of (0.07) epichlorohydrin according to the method of Meerwein, et al., Annalen der Chemie 641: 1–39 (Mar.) 1961. To this suspension is added a solution of 5.94 g. (0.06 mole) of N-methyl-2-pyrrolidinone in ether dropwise and the mixture is stirred for 2 hours. The ether is decanted from the clear, viscous oil and the oil washed with ether (50 ml.) by stirring and decantation. Fresh ether (100 ml.) is added and a solution of 2-(3,4-dimethoxy-$\beta$-methoxy)phenethylamine in ether (100 ml.) is added dropwise. The residue is stirred vigorously for 8 hours and allowed to stand overnight. The ether is then decanted from the amber, viscous oil. The oil is taken up in warm ethyl acetate, chilled and scratched until crystallization begins. 50 Mls. of ether is added. After filtration, there is collected about 26.5 g. of pale yellow crystals of the $HBF_4$ salt of 2-(3,4-dimethoxy-$\beta$-methoxyphenethyl)imino-1-methyl-pyrrolidine which is recrystallized from 100 ml. of methyl ethyl ketone with charcoaling to yield about 15.7 g. (69%) as white crystals, m.p. 124°–126°C. The $HBF_4$ salt is liberated as the free base with 10% NaOH. The base is extracted into ether or chloroform. The extracts are dried over sodium sulfate, filtered and the solvents removed under reduced pressure. The oily residue is taken up in isopropyl alcohol and a solution of 4.64 g. (0.04 mole) of fumaric acid in hot isopropyl alcohol is added. The solvent is removed under reduced pressure and the oily residue crystallizes under methyl ethyl ketone to give about 15 g. of white crystals which are recrystallized from isopropyl alcohol to give 2-(3,4-dimethoxy-$\beta$-methoxyphenethyl)imino-1-methyl-pyrrolidine fumarate as white crystals, m.p. 114°–116°C.

Calcd. for $C_{16}H_{24}N_2O_3 \cdot C_4H_4O_4$: C 58.81; H 6.91%.
Found: C 58.58; H 6.89%

EXAMPLE II

1-Benzyl-2-(3,4-diethoxy-$\beta$-methoxyphenethyl)iminopyrrolidine fumarate:

Triethyloxonium fluoroborate is prepared from 11.36 g. (0.08 mole) of boron trifluoride etherate and 5.55 g. (0.06 mole) of epichlorohydrin. The gummy crystals are washed with ether by decantation. Then dry methylene chloride is added followed by 8.76 g. (0.05 mole) of 1-benzyl-2-pyrrolidinone. The reaction mixture is allowed to stir overnight at room temperature protected from moisture ($CaCl_2$ tube). A solution of 11.97 g. (0.05 mole) of 3,4-diethoxy-$\beta$-methoxyphenethylamine in methylene chloride is then added. Stirring is continued for about 20 hours. Solvent removal in vacuo gives a residue which is dissolved in acetone and ether is added till almost to cloud point.

Cooling and scratching gives a crop of gummy crystals. Recrystallization from acetone-ether gives about 16.55 g. (68%) of the fluoroborate salt of 1-benzyl-2-(3,4-diethoxy-β-methoxyphenethyl)-imino-pyrrolidine, m.p. 113°–116°C. Conversion to the fumarate salt by conventional methods, after recrystallization from methanol-isopropanol, gives about 14.9 g. (58%) of pure fumarate salt; m.p. 146°–148°c.

EXAMPLE III 2-(3,4-Dimethoxy-β-hydroxy-β-phenethyl)imino-1-methylpyrrolidine:

Triethyloxonium fluoborate is prepared from 10.66 g. (0.096 mole) of epichlorohydrin and 18.17 g. (0.128 mole) of boron trifluoride etherate in 200 ml. of dry ether. The oily crystalline salt is washed with ether by decantation and 200 ml. of fresh ether is added followed by 9.52 g. (0.096 mole) of dry 1-methyl-2-pyrrolidinone. After stirring for 1.5 hours, the ether is decanted and the oil is washed with fresh ether (1 × 100 ml.). Methylene chloride (100 ml.) is added followed by 15.78 g. (0.08 mole) of 3,4-dimethoxy-β-hydroxy-β-phenethylamine dissolved in 50 ml. of methylene chloride. The reaction mixture is allowed to stir overnight. The reaction mixture is then shaken with 100 ml. of 10% NaOH. The organic layer is separated, dried over potassium carbonate and the solvent removed in vacuo to give 20.5 g. (92%) of crude solid, m.p. 120-123°C. Recrystallization from ethyl acetate-ether gives the pure product, 2 -(3,4-dimethoxy-β-hydroxy-β-phenethyl)-imino-1-methylpyrrolidine; m.p. 124°–125.5°C.

Anal. Calcd. for $C_{15}H_{22}N_2O_3$: N, 10.07%.
Found: N, 9.84%.

EXAMPLE IV 2-(3,4-Diethoxy-β-methoxyphenethyl)imino-1-methylpyrrolidine fumarate:

Triethyloxonium fluoborate is made from 45.42 g. (0.32 mole) of borontrifluoride etherate and 22.20 g. (0.24 mole) of epichlorohydrin. The salt is washed with anhydrous ether after decantation and additional anhydrous ether is again added. Then 17.84 g. (0.18 mole) of N-methyl-2-pyrrolidinone dissolved in dry ether is added dropwise with stirring. After 4 hours of stirring, the ether is decanted and the oily residue is washed with anhydrous ether. After adding fresh anhydrous ether to the oil, 43.29 g. (0.018 mole) of β-methoxy-3,4-diethoxyphenethylamine dissolved in ether is added dropwise with vigorous stirring. This reaction mixture is stirred over a period of 60 hours at room temperature. The ether is decanted and a small amount of acetone is added to the solid-gum residue. Crystallization occurs. Recrystallization from acetone gives about 35.5 g. of 2-(3,4-diethoxy-β-methoxyphenethyl)imino-1-methyl-pyrrolidine fluoborate. Conversion to the free base by means of alkali and subsequent fumarate formation gives a solid product, 2-(3,4-diethoxy-β-methoxyphenethyl)imino-1-methylpyrrolidine fumarate. Recrystallization from isopropanol affords the pure product, m.p. 116°–118°C.

Anal. Calcd. for $C_{18}H_{28}N_2O_3$ . C4H4O4: C, 60.53; H, 7.39%.
Found: C, 60.34; H, 7.35%.

EXAMPLE V 2-(3,4-Diethoxy-β-methoxyphenethyl)imino-1-methylpyrrolidine perchlorate:

Triethyloxonium fluoroborate is prepared from 11.10 g. (0.12 mole) of epichlorohydrin and 22.7 g. (0.16 mole) of boron trifluoride etherate. The crystalline salt is washed with fresh ether and 9.91 g. (0.1 mole) of N-methyl-2-pyrrolidinone in ether is added. After stirring for 3 hours at room temperature, the oil is washed by decantation with fresh ether. A solution of 3,4-diethoxy-β-methoxyphenethylamine in about 200 ml. of dry ether is added. Stirring is continued for 3 days during which time the product crystallizes. The crystals are collected by filtration and recrystallized from acetone to give 2-(3,4-diethoxy-β-methoxyphenethyl)imino-1-methyl-pyrrolidine fluoroborate, m.p. 132°–134°C. This salt is placed in a separatory funnel along with 10–20 ml. of water and 100 ml. of ether. Excess aqueous sodium hydroxide (12%) is added and the mixture shaken until solid disappears. Two additional extractions with 100 ml. portions of ether are carried out. The combined organics are dried over potassium carbonate and filtered. To the filtrate is added 6.46 g. (0.045 mole) of 70% perchloric acid. Scratching induces crystallization. Recrystallization from acetone-ether gives pure 2-(3,4-diethoxy-β-methoxyphenethyl)imino-1-methylpyrrolidine perchlorate, m.p. 127°–134°c.

Anal. Calcd. for $C_{18}H_{28}N_2O_3$ . HClO4: C, 51.37; H, 6.95; N, 6.66%.
Found: C, 51.07; H, 6.82; N, 6.50, 6.59%.

EXAMPLE VI 2-(3,4-Diethoxy-β-methoxyphenethyl)imino-1-methylpyrrolidine:

The fluoborate salt of 1-methyl-2-pyrrolidinone is prepared in the usual way on a 0.05 mole scale. To a solution of this salt in methylene chloride is added 12.0 g. (0.05 mole) of 3,4-diethoxy-β-methoxyphenethylamine in 30 ml. of methylene chloride. The reaction mixture is allowed to stir overnight at room temperature. Alkaline workup followed by two vacuum distillations gives 2-(3,4-diethoxy-β-methoxyphenethyl)imino-1-methylpyrrolidine, b.p. 143°–145°C. (0.035 mm).

EXAMPLE VII

This example demonstrates a procedural method of making the nitro-ethers of formula (VII).

A. β-(3,4-Diethoxyphenyl)-β-methoxy-nitroethane:
A suspension of pulverized 3,4-di-ethoxy-ω-nitrostyrene (71.8 g.; 0.3 mole) in 3 pints of absolute methanol is cooled under nitrogen with vigorous stirring to −10°C. in an ice-salt bath. A solution of 27.6 g. (1.2 g. atom) of sodium dissolved in 2 pints of absolute methanol is added such that the temperature does not exceed 0°C. Stirring is continued at −20° to 0°C. for 3.5 hours. Then 75 g. (1.25 moles) of glacial acetic acid is added with stirring. The solution is filtered from some unreacted nitrostyrene starting material. Most of the methanol is removed from the filtrate in vacuo. The syrupy residue is poured into ice-water. The resulting gummy solid is dissolved in 1.5 liters of benzene. The benzene solution is dried over anhydrous magnesium sulfate, filtered and the solvent removed in vacuo to give an oil. Addition of ether and scratching gives crystals of 62 -(3,4-diethoxyphenyl)-62 -methoxy-nitroethane which are recovered by filtration and dried, m.p. 86-87°C.

B. The procedure of Example VII-A is repeated except that an equivalent quantity each of 3,4-dimethoxy-ω-nitrostyrene, 3-ethoxy-4-methoxy-ω-nitrostyrene, 4-ethoxy-3-methoxy-ω-nitrostyrene and 4-n-butoxy-3-ethoxy-ω-nitrostyrene is substituted for the nitrostyrene starting material used therein to yield, as respective products, β-(3,4-dimethoxyphenyl)-β-methoxy-nitroethane, β-(3-ethoxy-4-methoxyphenyl)-62 -methoxy-nitroethane, β-(4-ethoxy-3-methoxyphenyl)-β-methoxynitroethane and β-(4-n-butoxy-3-ethoxyphenyl)-β-methoxynitroethane.

EXAMPLE VIII

This example demonstrates a procedural method of making the nitro-alcohols of formula (VIII).

A. β-(3,4-Diethoxyphenyl)-β-hydroxy-nitroethane: A solution of 50 g. (0.257 mole) of 3,4-diethoxybenzaldehyde and 17.3 g. (0.284 mole) of nitromethane in 250 ml. of 95% ethanol is cooled to −18°C. in an ice-salt-water bath. A cooled solution of 22.5 g. of 85% KOH pellets in 40 mls. water and 65 mls. ethanol is added over 30 minutes. After 2 hours of stirring at −18° to −14°C., 50 mls. of glacial acetic acid is added over 15 minutes. A thick slurry results. Water is added to a volume of 1 liter. The thick precipitated crystals of 3,4-di-ethoxy-β-hydroxy-nitroethane are collected by filtration, washed well with water and allowed to air-dry overnight; m.p. 132°-133.5°C. B. The procedure of Example VIII-A is repeated except that an equivalent quantity each of 3,4-dimethoxybenzaldehyde, 3-ethoxy-4-methoxybenzaldehyde, 4-ethoxy-3-methoxybenzaldehyde and 4-n-butoxy-3-ethoxybenzaldehyde is substituted for the benzaldehyde starting material used therein to yield, as respective products, the corresponding β-(3,4-dimethoxyphenyl), β-(3-ethoxy-4-methoxyphenyl), β-(4-ethoxy-3-methoxyphenyl) and β-(4-n-butoxy-3-ethoxyphenyl) derivative of β-hydroxy-nitroethane.

EXAMPLE IX

A. 3,4-Diethoxy-β-methoxyphenethylamine Hydrochloride: To a slurry of 36.8 g. (0.97 mole) of lithium aluminum hydride in 1 liter of ether is added 65.1 g. (0.242 mole) of β-(3,4-diethoxyphenyl)-β-methoxynitroethane as a solution in 1 liter of anhydrous ether. The addition is carried out with stirring and such that gentle reflux is maintained without external heat. The addition requires about 50 min. After the addition is complete, the reaction mixture is heated under reflux for 3 hours, then cooled in ice water, and, with stirring, 36.8 ml. of water is added dropwise with caution, followed by 36.8 ml. of 10% sodium hydrode (dropwise) and, finally ml. of water which can be added more rapidly. Stirring gives a white precipitate of inorganics which is filtered off and washed with ether. The filtrate is dried over anhydrous magnesium sulfate and the solvent removed in vacuo. The residual oil is taken up in fresh ether (200 ml.), and the solution is filtered, concentrated to about 100 ml., and then seeded and scratched to yield a precipitate which is filtered off, to give about 32.1 g. (55%) of crystalline free base, 3,4-diethoxy-β-methoxyphenethylamine. The mother liquors are treated with anhydrous hydrogen chloride, affording about 16.2 g. of the crude hydrochloride salt. Several recrystallization from ethanol (95%) and ethanol (95%) acetone gives about 5.0 g. (7%) of pure salt; m.p. 178°-179°C.

B. Alternatively, the reduction of the nitro-ether of Example IX-A, namely, β-(3,4-diethoxyphenyl)-62 -methoxynitroethane, can be performed by hydrogenation Raney nickel in glacial acetic acid. Following filtration from catalyst and solvent removal in vacuo, the residue is triturated and washed with ether to give the acetate salt of 3,4-diethoxy-β-methoxyphenethylamine, m.p. 9094°C.

EXAMPLE X

The reduction procedures of Example IX may be followed to prepare the amino-ethers of formula (III). Accordingly, by utilizing an equivalent quantity of each of the nitro-ethers obtained in Example VII-B as the starting material to be reduced, the following respective products are obtained, both in the form of the free base and the corresponding HCl and/or acetate salts:

3,4-dimethoxy-β-methoxy-β-phenethylamine:
3-ethoxy-4-methoxy-β-methoxy-β-phenethylamine;
4-ethoxy-3-methoxy-β-methoxy-β-phenethylamine; and
4-n-butoxy-3-ethoxy-β-methoxy-β-phenethylamine.

EXAMPLE XI 3,4-Diethoxy-β-hydroxy-β-phenethylamine: To 25.53 g. (0.1 mole) of 1-(3,4-diethoxyphenyl)-2-nitroethanol as a suspension in 250 ml. of glacial acetic acid is added one level teaspoonful of Raney nickel. The mixture is shaken for about 4 hours at 59 p.s.i. hydrogen pressure on a Parr apparatus. The catalyst is removed by filtration and the acetic acid is removed in vacuo to leave a green syrupy residue to which 100 mls. water is added, followed by 10% sodium hydroxide solution to a pH of about 6.5. Hydrogen sulfide gas is then bubbled through the solution for about 3 minutes. The resulting black suspension is allowed to stand overnight, followed by filtration through a filter-aid. The clear filtrate is made strongly alkaline with 50% sodium hydroxide solution. The oily precipitate is extracted with 3 × 250 ml. portions of warm ether. Upon cooling to −20°C., the product, 3,4-diethoxy-β-hydroxyphenethylamine, crystallizes out (about 21 g.) and is recovered by filtration and drying. Recrystallization from isopropanol-ether gives the pure product, m.p. (90) 92°-93.5°C.

EXAMPLE XII

The reduction procedure of Example XI may be followed to prepare the amino-alcohols of formula (III).

Accordingly, by utilizing an equivalent quantity of each of the nitro-alcohols obtained in Example VIII-B as the starting material to be reduced, the following respective products are obtained:

3,4-dimethoxy-$\beta$-hydroxy-$\beta$-phenethylamine;
3-ethoxy-4-methoxy-$\beta$-hydroxy-$\beta$-phenethylamine;
4-ethoxy-3-methoxy-$\beta$-hydroxy-$\beta$-phenethylamine; and
4-n-butoxy-3-ethoxy-$\beta$-hydroxy-$\beta$-phenethylamine.

EXAMPLE XIII

By repeating the procedure of Example II, except that an equivalent quantity of an appropriate amino-ether obtained from Example X or amino-alcohol obtained from Example XI and XII is used as the formula (III) amine to react with 1-benzyl-2-pyrrolidinone, the following respective products are obtained in the form of a fumarate salt:

1-benzyl-2-(3,4-dimethoxy-$\beta$-methoxy-$\beta$-phenethyl)iminopyrrolidine;
1-benzyl-2-(3-ethoxy-4-methoxy-$\beta$-methoxy-$\beta$-phenethyl)iminopyrrolidine; and
1-benzyl-2-(4-n-butoxy-3-ethoxy-$\beta$-methoxy-$\beta$-phenethyl)iminopyrrolidine.

EXAMPLE XIV

The procedure of Example III is repeated, except that an equivalent quantity of the appropriate amino-alcohol obtained from Examples XI and XII is substituted for the amino-alcohol used therein, to yield the following as respective products:

2-(3,4-diethoxy-$\beta$-hydroxy-$\beta$-phenethyl)imino-1-methylpyrrolidine;
2-(3-ethoxy-4-methoxy-$\beta$-hydroxy-$\beta$-phenethyl)imino-1-methylpyrrolidine;
2-(4-ethoxy-3-methoxy-$\beta$-hydroxy-$\beta$-phenethyl)imino-1-methylpyrrolidine; and
2-(4-n-butoxy-3-ethoxy-$\beta$-hydroxy-$\beta$-phenethyl)imino-1-methylpyrrolidine.

EXAMPLE XV 3,4-Diethoxy-$\beta$-hydroxy-$\beta$-phenethylamine: A suspension of 28.5 g. (0.112 mole) of 3,4-diethoxy$\beta$-hydroxy-nitroethane in 220 mls. of glacial acetic acid is shaken with hydrogen at 60 p.s.i. over one heaping spatula-spoonful of Raney nickel. Hydrogen uptake ceases after 4 hours of shaking. Excess acetic acid is removed in vacuo to give a green thick syrup which is treated with ether. The clear green solution, after scratching and cooling, yields crystals of crude 3,-4-diethoxy-$\beta$-hydroxy-$\beta$-phenethylamine acetate, in two crops; m.p. of first crop: 102°–103.5°C. The free base, a crystalline solid, is obtained by conventional treatment with alkali; m.p. (90) 92°–93.5°C.

EXAMPLE XVI 2-(3,4-Diethoxy-$\beta$-hydroxy-$\beta$-phenethyl)imino-1-methylpyrrolidine: To 17.03 g. (0.12 mole) of boron trifluoride etherate in dry ether is added a solution of 8.33 g. (0.09 mole) of epichlorohydrin in ether at such a rate that reflux is maintained. After stirring for 3 hours, the ther is decanted and the oily crystals are washed with fresh dry ether. Then 8.92 g. (0.09 mole) of 1-methyl-2-pyrrolidinone in 50 ml. of dry methylene chloride is added to the solution of triethyloxonium fluoborate in 75 ml. of methylene chloride. Stirring is continued overnight protected from moisture CaCl$_2$ tube). A solution of 3,4-diethoxy-$\beta$-hydroxy-$\beta$-phenethylamine, 16.90 g. (0.075 mole), in 130 ml. of warm dry methylene chloride is added over 10 min. Stirring is continued for 48 hours. The solvent is removed in vacuo to give a syrup containing the fluoborate salt of the desired product. Conversion to free base by sodium hydroxide solution (50%) and extraction into ether gives crystals of free base, 2-(3,4-diethoxy-$\beta$-hydroxy-$\beta$-phenethyl)imino-1-methylpyrrolidine, 16.23 g. (70.5%); m.p. 75°–77.5°C. The cyclohexanesulfamate salt is prepared from the base, m.p. 120°–125°C.

EXAMPLE XVII 2-(4-Ethoxy-3,$\beta$-dimethoxy-$\beta$-phenethyl)imino-1-methylpyrrolidine: Triethyloxonium fluoborate is made by adding 5.55 g. (0.06 mole) of epichlorohydrin, dissolved in anhydrous ether, to a solution of 11.35 g. (0.08 mole) of boron trifluoride etherate in anhydrous ether, under nitrogen, with vigorous stirring. The mixture is stirred at room temperature for 2 hours and the ether is decanted. The residue is washed with fresh anhydrous ether; the ether is then decanted; and the residue is dissolved in anhydrous methylene chloride. To this solutiion is added dropwise with stirring 5.95 g. (0.06 mole) of 1-methyl-2-pyrrolidinone. This reaction mixture is stirred at room temperature for 2-¾ hours and then 13.52 g. (0.06 mole) of $\beta$-methoxy-3-methoxy-4-ethoxy-phenethylamine, dissolved in anhydrous methylene chloride, is added. The reaction mixture is stirred at room temperature overnight. The solvent is evaporated in vacuo and the resulting yellow oil is triturated which isopropanol; solidification occurs to yield the HBF$_4$ salt of product, m.p. 118°–120°C. Recrystallization from isopropanol yields the pure HBF$_4$ salt, m.p. 120°–122°C. This is converted to the free base, 2-(4-ethoxy-3,$\beta$-dimethoxy-$\beta$- phenethyl)imino-1-methylpyrrolidine, by addition of 5-½ mls. of 50% NaOH, (with ice bath cooling), a little water, and ether extraction. After drying over K$_2$CO$_3$, the ether is evaporated in vacuo leaving a 10 g. oil residue which is converted to the fumarate salt. Recrystallization from isopropanol yields the pure fumarate salt, m.p. 98°–100°C.

EXAMPLE XVIII 1-n-Butyl-2-(3,4-diethoxy-$\beta$-methoxyphenethyl)iminopyrrolidine fumarate: Triethyloxonium fluoborate is prepared in the usual way from 11.36 g. (0.08 mole) of boron trifluoride etherate and 5.55 g. (0.06 mole) of epichlorohydrin. To the crystalline oily salt is added in methylene chloride a solution of 7.06 g. (0.05 mole) of 1-n-butyl-2-pyrrolidinone. After stirring overnight CaCl$_2$ tube), 11.97 g. (0.05 mole) of 3,4-diethoxy-methoxyphenethylamine is added over 3 min. as a solution in methylene chloride. Stirring is continued overnight at ambient temperatures. The solvent is removed in vacuo and the oily residue is dissolved in 20–30 ml. of acetone; then ether is added to the cloud point. Cooling and scratching gives the fluoborate salt of the desired product which is recrystallized from isopropanol-ether; m.p. 88°–90°C. An additional recrystallization gives material melting at (91) 92°–95°C. Conversion to free base, 1-n-butyl-2-(3,4-diethoxy-$\beta$-methoxyphenethyl)imino-pyrrolidine, by conventional treatment with alkali and then to the fumarate salt gives, after recrystallization from 2-butanone, the fumarate m.p. as (91) 92°–94°C.

EXAMPLE XIX

A. (+)-3,4-Diethoxy-β-methoxyphenethylamine l-mandelate: Racemic 3,4-diethoxy-β-methoxyphenethylamine, in the form of the free base, is converted to the l-mandelate salt form in methanol by treatment with l-mandelic acid (equimolar amounts). Boiling off the methanol while replacing it with isopropanol until all the methanol has evaporated yields the crude salt as a precipitate upon cooling. After repeated recrystallizations (at least six) from isopropanol, the l-mandelate salt of (+)-3,4-diethoxy-β-methoxyphenethylamine is obtained, m.p. 144.5°–146.5°C ($\alpha_D^{EtOH}$ + 20.8±0.9°).

Anal. Calcd. for $C_{13}H_{21}NO_3 \cdot C_8H_8O_3$: C, 64.43; H, 7.47%.
Found: C, 64.30; H, 7.42%.

B. (−)-3,4-Diethoxy-β-methoxyphenethylamine d-mandelate: By repeating the procedure of Example XIX-A, except that an equivalent amount of d-mandelic acid is initially employed instead of l-mandelic acid, there is obtained as product, (−)-3,4-diethoxy-β-methoxyphenethylamine d-mandelate, m.p. 144.5°–146.5°C ($\alpha_D^{EtOH}$ −18.5±1.1°).

Anal. Calcd. for $C_{13}H_{21}NO_3 \cdot C_8H_8O_3$: C, 64.43; H, 7.47%.
Found: C, 64.16; H, 7.42%.

EXAMPLE XX (+)-2-(3,4-Diethoxy-β-methoxyphenethyl)imino-1-methylpyrrolidine fumarate hydrate: To 3.79 g (0.0267 mole) of boron trifluoride etherate in anhydrous ether is added 1.85 g (0.02 mole) of epichlorohydrin with vigorous stirring over one minute. After stirring for 3 hours, the gummy crystals of triethyl oxonium fluoborate are washed with fresh dry ether (under $N_2$) by decantation. To these crystals is added a solution of 1.98 g (0.02 mole) of dry 1-methyl-2-pyrrolidinone in 50 ml of dry methylene chloride. After stirring for 2.5 hr., a solution of 4.78 g of (+)-3,4-diethoxy-β-methoxyphenethylamine (0.02 mole) in 10 ml of dry methylene chloride is added under $N_2$ with cooling (ice $H_2O$ bath). [The phenethylamine free (+)-base is prepared from the (+)-3,4-diethoxy-β-methoxyphenethylamine l-mandelate salt of Example XIX-A, by neutralization with aqueous NaOH; extraction into ether, drying over $K_2CO_3$, filtration and removal of solvent in vacuo.] The reaction mixture is allowed to stir overnight (about 16 hours) allowing the ice bath to warm to ambient temperature. Solvent removal in vacuo affords an oil which, when scratched with ether, crystallizes. Recrystallization gives the fluoborate salt of (+)-2-(3,4-diethoxy-β-methoxyphenethyl)-imino-1-methylpyrrolidine. Conventional conversion to the corresponding free base, extraction with $CH_2Cl_2$ and treatment with an equimolar amount of fumaric acid in isopropanol containing an equimolar amount of water gives the corresponding fumarate salt hydrate which is precipitated with ether. Recrystallization from acetone-ether several times (the material does not crystallize from solution; it first oils out and then crystallizes upon cooling and scratching) gives a homogeneous product on thin layer chromatography, m.p. 64°–66°C ($\alpha_D^{EtOH}$+61.7±1.16°; 58.9°±2.2°).

EXAMPLE XXI (−)-2-(3,4-Diethoxy-β-methoxyphenethyl)imino-1-methylpyrrolidine fumarate hydrate: To 5.68 g (0.04 mole) of boron trifluoride etherate in 50 ml of anhydrous ether is added 2.78 g (0.03 mole) of epichlorohydrin in 50 ml of ether over a 2 min. period with vigorous stirring. After 3.5 hr. of stirring, the ether is decanted (nitrogen atmosphere) and the oily crystals are washed with fresh anhydrous ether and the ether discarded. Then 50 ml of dry methylene chloride is added followed by 2.97 g (0.03 mole) of dry 1-methyl-2-pyrrolidinone in 25 ml of dry $CH_2Cl_2$. The mixture is stirred under $N_2$ for 3.5 hr.

Treatment of 9.8 g of the d-mandelate salt of (−)-3,4-diethoxy-β-methoxyphenethylamine (see Example XIX-B) with excess NaOH (10%), followed by extraction into $CH_2Cl_2$ (3 × 50 ml), drying over $K_2CO_3$, filtration and removal of the solvent in vacuo gives the corresponding free (−)-base which is taken up in fresh dry $CH_2Cl_2$ and added with ice bath cooling to the previously prepared fluoborate complex with stirring under $N_2$. The cooling bath is allowed to warm to ambient temperature while the reaction mixture is stirred overnight (about 16 hours). Solvent removal in vacuo yields an oil which crystallizes when scratched under ether. Recrystallization from isopropanol-ether gives the fluoborate salt of (−)-2-(3,4-diethoxy-β-methoxyphenethyl)-imino-1-methylpyrrolidine. Conversion to free base (10% NaOH), extraction with $CH_2Cl_2$, drying ($K_2CO_3$) and solvent removal in vacuo gives the corresponding free (−)-base. Conversion of the free (−)-base to the corresponding fumarate salt in acetone-ether containing an equimolar amount of water, followed by recrystallization from acetone-ether yields the pure product, (−)-2-(3,4-diethoxy-β-methoxyphenethyl)imino-1-methylpyrrolidine fumarate hydrate, m.p. 62°–64°C ($\alpha_D^{EtOH}$−63.9±3.3°; −63.7±1.5°).

EXAMPLE XXII

A. β-Ethoxy-β-(3,4-diethoxyphenyl)-nitroethane: A suspension of 47.45 g (0.2 mole) of 3,4-diethoxy-+-nitrostyrene in 2 pints of absolute ethanol is cooled to −40°C (dry ice-methanol bath) under a nitrogen atmosphere (it is preferable to bubble $N_2$ through the stirring mixture). With vigorous stirring, a solution of 18.4 g (0.8 g atom) of sodium dissolved in 1 pint of absolute ethanol is added over 10 min. (the temperature after the addition is about −23°C). Stirring is continued for 2 hours at −15° to −20°C and for 3 hours at −5° to +5°C. The reaction mixture is quenched with 60 g (1 mole) of glacial acetic acid and cooled to −50°C. Water is added until separation of crystals is complete (about 3.5 liters total volume). The resulting product, β-ethoxy-β-(3,4-diethoxyphenyl)-nitroethane is recrystallized from ethanol 95% to give 27.7 g (49%) of the nitroether; m.p. 71.5°–74°C.

B. β,3,4-Triethoxyphenethylamine acetate: A solution of 27 g (0.095 mole) of the foregoing nitroether in 200 ml of glacial acetic acid is hydrogenated over Raney nickel catalyst at a starting pressure of 60 p.s.i. The hydrogen uptake ceases after about 5 hours. Solvent removal in vacuo followed by the addition of 250 ml ether gives the product, β,3,4-triethoxyphenethylamine acetate, as a crystalline solid. Recrystallization from 95% ethanol (minimum amt.)-ether gives about 19g (64%) of the pure salt; m.p. 65°–67°C.

C. 1-Methyl-2-($\beta$,3,4-triethoxyphenethyl)-iminopyrrolidine fumarate hydrate: To a solution of 11.36 g (0.08 mole) of boron trifluoride etherate in anhydrous ether is added 5.55 g (0.06 mole) of epichlorohydrin at such a rate as to maintain reflux. After stirring for 3 hours, the gummy crystals are washed with fresh ether by decantation and dissolved in 50 ml of dry methylene chloride. To this solution is added 5.95 g (0.06 mole) of 1-methyl-2-pyrrolidinone with stirring. After stirring for 3 hours at room temperature, the mixture is cooled in an ice-water bath and a solution of $\beta$,3,4-triethoxyphenethylamine [prepared from the acetate salt by treatment with NaOH (10%)] in dry methylene chloride is added. Stirring is continued overnight (about 16 hours), allowing the ice bath to melt to ambient temperature. Solvent removal in vacuo followed by trituration with isopropanol-ether gives about 20 g (95%) of the fluoroborate salt of 1-methyl-2-($\beta$,3,4-triethoxyphenethyl)imino pyrrolidine which is recrystallized from isopropanol-ether, m.p. 64°–68°C. Conversion to free base (10% NaOH) followed by an equimolar quantity of fumaric acid in isopropanol and dilution with ether gives the corresponding fumarate salt. Recrystallization from acetone gives the pure salt which is dried in vacuo to remove acetone; followed by equilibration with water vapor in a humidity chamber affords the product, 1-methyl-2-($\beta$,3,4-triethoxyphenethyl)iminopyrrolidine fumarate hydrate, as colorless crystals, m.p. 72°–74°C.

EXAMPLE XXIII

A. $\beta$-Methoxy-$\beta$-(2,4-dimethoxyphenyl)-nitroethane: The initial reaction procedure of Example XXII-A is followed except than an equivalent quantity of 2,4-dimethoxy-$\omega$-nitrostyrene is used as the starting material. After the reaction mixture is acidified with glacial acetic acid, most of the solvent is removed in vacuo. Dilution with water yields an oil which is extracted into ether. The ether extract is dried over anhydrous MgSO$_4$ and the solvent removed in vacuo leaving an oily residue of $\beta$-methoxy-$\beta$-(2,4-dimethoxyphenyl)-nitroethane which may be used in the next step without further purification.

B. $\beta$,2,4-Trimethoxyphenethylamine acetate: The crude oily nitroether obtained above (about 48g, 0.2 mole) is taken up in 200 ml of glacial acetic acid and hydrogenated over Raney nickel catalyst at a starting pressure of 60 p.s.i. until hydrogen uptake ceases. Solvent removal in vacuo followed by trituration with ether gives the crude salt, $\beta$,2,4-trimethoxyphenethylamine acetate. Recrystallization from methanol (minimum)-ether and finally from isopropanol yields the pure product, m.p. 124°–5°C.

C. 1-Methyl-2-($\beta$,2,4-trimethoxyphenethyl)-iminopyrrolidine fumarate: The preparation of triethyloxonium fluoborate is carried out on the same scale as described in Example XXII-C. To the resulting solution is added the same amount of 1-methyl-2-pyrrolidinone (0.06 mole) and to the thus-obtained fluoborate complex is added 0.05 mole of $\beta$,2,4-trimethoxyphenethylamine (conventionally prepared from the amino-ether acetate salt of the preceding paragraph by treatment with 10% NaOH, extraction and drying over excess anhydrous K$_2$CO$_3$) in dry methylene chloride (ice-water bath). Stirring is continued overnight, allowing the ice-bath to melt to ambient temperature. Solvent removal in vacuo affords an oily residue of the fluoborate salt which is converted to the corresponding free base (m.p. 65°–68°C) by treatment with 10% NaOH. Treatment with a molar equivalent of fumaric acid yields, after recrystallization from methanol-isopropanol-acetone, the pure product, 1-methyl-2-($\beta$,2,4-trimethoxyphenethyl)iminopyrrolidine fumarate, m.p. 132°–4°C.

EXAMPLE XXIV

A. 4-Methoxy-3-methyl-$\omega$-nitrostyrene: A solution of 60.0 g (0.4 mole) of 3-methyl-p-anisaldehyde, 60 ml of nitromethane and 10 g of ammonium acetate in 150 ml glacial HOAc is allowed to reflux overnight. After excess nitromethane and solvent are removed in vacuo, about 500 ml of ice-water is added giving a crystalline solid. Recrystallization from methanol and finally from ether gives the pure product, 4-methoxy-3-methyl-$\omega$-nitrostyrene, m.p. 79°–80.5°C.

B. 2-(4-methoxy-3-methyl)phenyl-2-methoxynitroethane: To a stirred slurry of 26 g (0.135 mole) of 4-methoxy-3-methyl-$\omega$-nitrostyrene in 250 ml of methanol, cooled to −20°C with an isopropyl alcohol-dry ice bath and with a steady stream of nitrogen passing through the slurry, there is added a sodium methoxide solution prepared by dissolving 12.5 g (0.54 g-atom) of sodium in 200 ml of methanol. The sodium methoxide solution is added as rapidly as possible maintaining the temperature at −10°C. Stirring is continued for 5 hours at −10°C at which time almost everything has dissolved to form a cloudy, pale yellow solution. The reaction mixture is filtered through Super Cel, cooled and 33 g (0.55 mole) of glacial acetic acid is added. The mixture is maintained at 0°–10°C for about 3 hours. The solvent is then evaporated (to dryness) under reduced pressure and ether is added to the semisolid residue which is washed several times with water and then dried in ether over MgSO$_4$. The solvent is removed to dryness under reduced pressure to yield an amber oil residue of 2-(4-methoxy-3-methyl)phenyl-2-methoxynitroethane, which is used without further purification in the next step.

C. 2-(4-Methoxy-3-methyl-$\beta$-methoxy-phenethylamine acetate: A solution of 22.5 g (0.1 mole) of 2-(4-methoxy-3-methyl)phenyl-2-methoxynitroethane (based on the oily product obtained in paragraph B) in 100 ml of glacial HOAc is hydrogenated (46 p.s.i.) in the presence of Raney nickel catalyst on a Parr shaker until the hydrogen uptake ceases (about 6 hours). The reaction mixture is filtered through Super Cel, washed with glacial HOAc and the solvent removed under reduced pressure (to dryness). The thus obtained green viscous oily residue is taken up in ether from which white crystals form upon scratching. Recrystallization from isopropanol and then ether yields the pure product, 2-(4-methoxy-3-methyl-$\beta$-methoxy)phenethylamine acetate, m.p. 84°–86°C.

D. 2-(4-Methoxy-3-methyl-$\beta$-methoxyphenethyl)-imino-1-methylpyrrolidine fumarate hemihydrate: Triethyloxonium fluoborate is prepared in the usual way from 9.3 g (0.065 mole) of boron trifluoride etherate and 5.1 g (0.055 mole) of epichlorohydrin. To the salt in 200 ml of dry methylene chloride is added a solution of 5.0 g (0.05 mole) of 1-methyl-2-pyrrolidinone in 50 ml of dry methylene chloride. The mixture is stirred at room temperature for 4 hours and then cooled to −10°C. A solution of 2-(4-methoxy-3-methyl-β-methoxy)phenethyl amine(obtained from the corresponding acetate salt by conventional treatment with alkali) in dry methylene chloride is then added dropwise using an ice-water bath. Stirring is continued for about 20 hours, allowing the ice-bath to melt to ambient temperature. The solvent is evaporated to dryness under reduced pressure to yield a tan viscous oily residue which crystallizes under ether. Recrystallization from methyl ethyl ketone-ether affords the fluoborate salt of 2-(4-methoxy-3-methyl-β-methoxyphenethyl)imino-1-methylpyrrolidine as white crystals, m.p. 104°–6°C. The corresponding free base is liberated by treatment in the cold with 50% NaOH, followed by extraction with ether-chloroform, and drying the extract over $K_2CO_3$. After filtering, the solvent is evaporated to dryness under reduced pressure to give a pale yellow oily residue which is taken up in approximately 5 ml isopropanol and treated with a solution of fumaric acid in hot isopropanol. Upon cooling, white crystals of 2-(4-methoxy-3-methyl-β-methoxyphenethyl)imino-1-methylpyrrolidine fumarate hemihydrate are formed, collected and recrystallized from isopropanol, m.p. 89°–91°C.

EXAMPLE XXV

A. 2-[(3,4-Diethoxy-β-methoxyphenethyl)imino]-1,5-dimethylpyrrolidine fumarate: Triethyloxonium fluoborate is made in the usual manner using 11.35 g (0.08 mole) of borontrifluoride etherate and 5.55 g (0.06 mole) of epichlorohydrin. After dissolving the fluoborate in 200 ml of anhydrous methylene chloride, 6.79 g (0.06 mole) of 1,5-dimethyl-2-pyrrolidinone, dissolved in anhydrous methylene chloride, is added dropwise with stirring. The reaction mixture is stirred at room temperature overnight (about 16 hours). Then 14.36 g (0.06 mole) of 3,4-diethoxy-β-methoxyphenethylamine, dissolved in dry $CH_2Cl_2$, is added dropwise with stirring using an ice-water bath. Stirring is continued to room temperature overnight. The solvent is evaporated in vacuo leaving an oily residue, which on cooling, crystallizes. The solid, which is the $HBF_4$ salt of 2-[(3,4-diethoxy-β-methylphenethyl)imino]-1,5-dimethylpyrrolidine, is collected and washed with ether, m.p. 99°–101°C. Recrystallizations from isopropanol-ether yields the pure $HBF_4$ salt, m.p. 103°–106°C. Standard conversion to the free base and subsequent treatment with fumaric acid gives the fumarate salt, m.p. 105°–109°C. Fractional crystallization from acetone affords about 7.8 g of one diastereoisomeric d,1-pair of 2-[(3,4-diethoxy-β-methoxyphenethyl)imino]-1,5-dimethylpyrrolidine fumarate.

B. Upon further cooling of the mother liquor, a second diastereoisomeric d,1-pair of 2-[(3,4-diethoxy-β-methoxyphenethyl)imino]-1,5-dimethylpyrrolidine fumarate is obtained, which, after recrystallization from acetone, has a m.p. of 75°–79°C.

EXAMPLE XXVI

2-[(3,4-Methylenedioxy-β-methoxyphenethyl)imino]-1-methylpyrrolidine hydrochloride: To a solution of 17.04 g (0.12 mole) borontrifluoride etherate in 150 cc absolute ether is added 8.34 g (0.09 mole) of epichlorohydrin in 150 cc absolute ether with stirring. The mixture is protected from moisture ($C_aCl_2$ drying tube) and stirred for 3 hours at room temperature. The ether is then decanted, and the semicrystalline intermediate is washed twice with 50 cc fresh dry ether (discarded) and then dissolved in 90 cc dry methylene chloride. A solution of 8.91 g (0.09 mole) of N-methyl-2-pyrrolidinone in 75 cc dry methylene chloride is added and the mixture stirred for 4 hours at room temperature (again protected from moisture). 13.08 Grams (0.07 mole) of 3,4-methylenedioxy-α-methoxy-β-phenethylamine in 45 cc of dry methylene chloride is added, and the mixture is stirred overnight at room temperature (still protected from moisture). The mixture is then washed twice with 50 cc 20% NaOH (discarded), dried over $K_2CO_3$, then evaporated under vacuum to give about 18.0 g (93%) of crude amidine product. The crude amidine is dissolved in 500 cc absolute ether which is then saturated with dry HCl gas to precipitate the hydrochloride salt. The white, flocculent hydrochloride is filtered off and recrystallized by first dissolving in methanol, displacing the methanol with isopropanol by boiling, cooling and then adding excess absolute ether. After 3 crystallizations, about 16.30 g (74%) of pure product, 2-[(3,4-methylenedioxy-β-methoxyphenethyl)imino]-1-methylpyrrolidine hydrochloride, is obtained, m.p. 211.5°–212.5°C.

EXAMPLE XXVII 2,6-Dichloro-β-nitrostyrene: 52.5 g (0.3 mole) of 2,6-dichloro-benzaldehyde, 36.6 g (0.6 mole) of nitromethane, and 11.56 g (0.15 mole) of ammonium acetate are dissolved in 420 cc glacial acetic acid. The mixture is refluxed 5 hours and then allowed to come to room temperature slowly. The resulting deep red solution is then reheated on a steam bath, water is added to cloudiness and the mixture then swirled in an ice bath. The yellow-orange precipitate is filtered, and the filtrate is again heated on steam bath, treated with water to cloudiness, and cooled in ice to obtain a second crop of crude product. Both crops are combined; taken up into hot 95% ethanol; treated with charcoal several times; and excess solvent is removed under vacuum. The product, 2,6-dichloro-β-nitrostyrene, is obtained by slow crystallization from 400 ml 95% ethanol. Recrystallization from 95% ethanol yields the product as long, light yellow needles, m.p. 63°–64.5°C.

B. 1-(2,6-Dichlorophenyl)-1-methoxy-2-nitroethane: 23.3 g (0.094 mole) of 2,6-dichloro-β-nitrostyrene is dissolved in 500 cc absolute methyl alcohol. Dry nitrogen is bubbled through the solution which is also protected from moisture ($C_aCl_2$ drying tube). The temperature is lowered to 0°C by means of an ice bath, and with mechanical stirring a solution of 8.65 g (0.376 g atoms) of sodium in 400 cc absolute methyl alcohol is added over a 10 minute period. The mixture is stirred 5 hours at 0°–5°C and then quenched with 28.22 g (0.47 mole) of glacial acetic acid added over 10 minutes. Most of the solvent is removed under vacuum and the remainder is treated with 2 liters of ice water. After storing at 0°C overnight (about 16 hours), the yellow solid which precipitates is filtered, m.p. 42°–43°C, then dissolved in 200 cc 95% EtOH (hot), treated with charcoal, filtered, and the filtrate evaporated under vacuum to give the nitroether product,1-(2,6-dichlorophenyl)-1-methoxy-2-nitroethane, as a light yellow liquid.

C. 2,6-Dichloro-α-methoxy-β-phenethylamine hydrochloride: 22.25 g (0.089 mole) of 1-(2,6- dichlorophenyl)-1-methoxy-2-nitroethane in 100 cc glacial acetic acid is hydrogenated in the presence of Raney nickel catalyst beginning with 50 lbs. $H_2$ in a Parr apparatus. Hydrogenation is continued until the theoretical amount of hydrogen is taken up. The mixture is filtered through diatomaceous earth, and the filtrate evaporated under vacuum to give a viscous green liquid of crude amine acetate which is dissolved in 100 cc water, basified with 20% NaOH, extracted twice with 300 cc ether, dried over $K_2CO_3$, and finally evaporated under vacuum to give about 16.22 g (83%) of light yellow liquid amine product as the free base (store under nitrogen!). 9.0 Grams of the amine is dissolved in 500 cc absolute ether which is then saturated with dry HCl gas. The resultant white, fluffy hydrochloride is filtered and recrystallized twice from methanol-ether to give the crystalline hydrochloride product, 2,6-dichloro-α-methoxy-β-phenethylamine hydrochloride, m.p. 231°–232°C.

D. 2-[(2,6-dichloro-β-methoxyphenethyl)imino]-1-methylpyrrolidine hydrochloride hydrate: To a solution of 21.30 g (0.15 mole) of boron trifluoride etherate in 120 cc absolute ether is added a solution of 11.10 g (0.12 mole) of epichlorohydrin in 120 cc dry ether with stirring. Stirring is continued at room temperature for 3 hours with the mixture protected from moisture ($C_aCl_2$ drying tube). The ether is decanted, and the semi-crystalline intermediate is washed twice with 50 cc fresh dry ether (discarded). The intermediate is dissolved in 45 cc dry methylene chloride, and a solution of 11.88 g (0.12 mole) of N-methyl-2-pyrrolidinone in 45 cc dry methylene chloride is added with stirring. The mixture is stirred at room temperature for 4 hours (again protected from moisture). A solution of 19.8 g (0.09 mole) of 2,6-dichloro-α-methoxy-β-phenethylamine in 45 cc dry methylene chloride is then added and the mixture is stirred overnight at room temperature (still protected from moisture). The mixture is washed twice with 50 cc 20% NaOH (discarded), dried over $K_2CO_3$, and evaporated under vacuum to give about 26.50 g (98%) of crude amidine product. The crude amidine is dissolved in 500 cc absolute ether which is then saturated with dry HCl gas. The hydrochloride which precipitates is filtered and recrystallized from ethanol/ether. The fluffy-white product, 2-[(2,6-dichloro-β-methoxyphenethyl)imino]-1-methylpyrrolidine hydrochloride hydrate, is filtered and air dried, m.p. 168°–169°C. The salt is recrystallized twice more from ethanol/ether, dried at 80°C under vacuum to produce the corresponding anhydrous salt, m.p. 193°–194°C. (If allowed to equilibrate with air moisture, the m.p. returns to 169°–169.5°C.)

EXAMPLE XXVIII

A. 3-Ethoxy-4-methoxy-ω-nitrostyrene, m.p. 133°–136°C., is obtained by repeating the procedure of Example XXIV except that an equivalent quantity of 3-ethoxy-p-anisaldehyde is used as the starting material.

B. 2-(3-Ethoxy-4-methoxyphenyl)-2-methoxy-nitroethane By repeating the procedure of Example XXII-A except that an equivalent quantity of the foregoing nitrostyrene is employed, there is obtained as final product, 2-(3-ethoxy-4-methoxyphenyl)-2-methoxy-nitroethane, m.p. 77°–79°C.

C. 3Ethoxy-β,4-dimethoxyphenethylamine acetate: A slurry of 43.5 g (0.17 mole) of 2-(3-ethoxy-4-methoxyphenyl)-2-methoxy-nitroethane in 200 ml glacial HOAc is hydrogenated in the presence of wet Raney nickel catalyst in a Parr apparatus. After shaking at an initial H2 pressure of 60 p.s.i. for 4 hours, no further uptake is noted. Filtration of catalyst and removal of solvent in vacuo yields a green syrupy product which is dissolved in ether, the solution cooled and scratched to give crude 3-ethoxy-β,4-dimethoxyphenethylamine acetate. The salt is taken up in methanol-isopropanol, the solvent removed and ether added, m.p. 102°–104°C.

D. 2-(3-Ethoxy-β,4-dimethoxyphenethyl)imino-1-methylpyrrolidine cyclohexanesulfamate: To a solution of 11.36 (0.08 mole) of borontrifluoride etherate in 100 ml of dry ether is added with vigorous stirring 5.55 g (0.06 mole) of epichlorohydrin in 50 ml of dry ether over 2 min. After stirring for 3 hours, the resultant oily crystals are washed with fresh dry ether by decantation and then dissolved in 50 ml of dry methylene chloride to which is added 5.95 g (0.06 mole) of 1-methyl-2 -pyrrolidone. After stirring for 3 hours, a solution of 3-ethoxy-β,4-di methoxyphenylamine (obtained from the acetate salt by conventional treatment with alkali) in 50 ml of dry methylene chloride is added with cooling (ice-water bath). The mixture is stirred overnight, allowing the ice bath to warm to ambient temperature. Removal of solvent in vacuo yields the crystalline HBF4 salt (about 20 g). Recrystallization from ethyl acetate gives the pure fluoroborate salt. Conversion to free base, followed by treatment with 6.3 g (0.035 mole) of hexamic acid in acetone gives the corresponding cyclohexanesulfamate salt. Recrystallization from acetone-ether gives the pure product, 2-(3-ethoxy-β,4-dimethoxyphenethyl)imino-1-methylpyrrolidine cyclohexanesulfamate, m.p. 111–113°C.

EXAMPLE XXIX

A. 4-Benzyloxy-3-ethoxy-ω-nitrostyrene: A solution of 43.64 g (0.17 mole) of 4-benzyloxy-3-ethoxybenzaldehyde and 10.6 g (0.174 mole) of nitromethane in ethanol (95%) is treated with 0.99 g of acetic acid and 1.14 g of benzylamine. After stirring for 2 days at about 50°C, the product is collected by filtration, about 23 g yield. Another 10.6 g portion of nitromethane is added to the mother liquors and stirring continued for one day. A second crop of product is obtained and combined with the first crop, total yield about 48.5 g (95.5%). Recrystallization from acetone-ethanol gives the pure product, 4-benzyloxy-3-ethoxy-ω-nitrostyrene, m.p. 128–130°C.

B. 2-(4-Benzyloxy-3-ethoxyphenyl)-2-methoxy-nitroethane: A suspension of 59.87 g (0.2 mole) of 4-benzyloxy-3-ethoxy-ω-nitrostyrene in 1 pint of absolute methanol is cooled in a dry ice-methanol bath to -40°C under $N_2$. Then a solution of 13.8 g (0.6 g-atom) of sodium in 1.5 pints of methanol is added over 1 min. The final temperature is −10°C. The mixture is stirred under $N_2$ at −10°C to 9°C for 3.25 hr. during which time the mixture becomes nearly homogeneous. Then 42 g (0.7 mole) of glacial acetic acid is added followed by 2 liters of ice water. The resulting gum is extracted into ether, washed with water and brine, dried, and the solvent removed in vacuo to afford about 63.4 g (96%) of an oily residue of crude 2-(4-benzyloxy-3-ethoxyphenyl)-2-methoxynitroethane, which is used without further purification in the next step.

C. 4-Benzyloxy-3-ethoxy-β-methoxyphenethylamine acetate: A solution of 46.8 g (0.16 mole) of the foregoing nitroether in 200 ml of glacial acetic acid is hydrogenated over Raney nickel catalyst in a Parr apparatus at a starting pressure of 62 p.s.i. After 4.5 hr., hydrogen uptake ceases. Filtration from catalyst, removal of solvent in vacuo and recrystallization from methanol-ethanol-ether yields the pure product, 4-benzyloxy-3-ethoxy-β-methoxy-phenethylamine acetate, m.p. 129.5–131°C.

D. 2-(4-Benzyloxy-3-ethoxy-β-methoxyphenethyl)imino-1-methylpyrrolidine saccharinate: Triethyloxonium fluoborate is prepared in dry ether under $N_2$ from 9.25 g (0.1 mole) of epichlorohydrin and 18.9 g (0.133 mole) of borontrifluoride etherate. The oily crystals are washed with fresh dry ether (washings discarded) and then dissolved in dry methylene chloride to which 9.91 g (0.1 mole) of dry 1-methyl-2pyrrolidinone in 100 ml of dry $CH_2Cl_2$ is added. Stirring is continued for 4 hours. 30.0 Grams (0.083 mole) of 4-benzyloxy-3-ethoxy-β-methoxyphenethylamine (obtained from the acetate salt by conventional treatment with alkali) is added with ice-bath cooling. After stirring overnight, the solvent is removed in vacuo and the thus obtained crude HBF4 salt is converted to free base followed by conversion to the saccharin salt in acetone. After recrystallization of the salt from acetone, about 39 g (83%) of pure product, 2-(4-benzyloxy-3-ethoxy-β-methoxy phenethyl)imino-1-methylpyrrolidine saccharinate, m.p. 123°–125°C.

EXAMPLE XXX 2-(3-Ethoxy-4-hydroxy-β-methoxyphenethyl)imino-1methylpyrrolidine saccharinate: A solution of 11.31 g (0.02 mole) of 2-(4-benzyloxy-3-ethoxy-β-methoxyphenethyl)-imino-1-methylpyrrolidine saccharinate in 80 ml of methanol is hydrogenated over 10% Pd/C catalyst at a starting pressure of 60 p.s.i. After 2 hours, the catalyst is removed by filtration and the filtrate taken to dryness in vacuo. The residue is recrystallized from ethanol-acetone to give the pure product, 2-(3-ethoxy-4-hydroxy-β-methoxyphenethyl)imino-1-methylpyrrolidine saccharinate, m.p. 159.5°–160.5°C.

EXAMPLE XXXI

A. 3-Benzyloxy-4-ethoxy-β-nitrostyrene: A solution of 3.85 g (0.036 mole) of benzylamine and 2.16 g (0.036 mole) of acetic acid in 20 ml of 95% ethanol is added to a solution of 51.2 g (0.2 mole) of 3-benzyloxy-4-ethoxy-benzaldehyde in 100 ml of 95% ethanol. To this mixture is added a solution of 15.80 g (0.259 mole) of nitromethane in 10 ml of ethanol with stirring. Stirring is continued for approximately 2 hours at room temperature and the mixture allowed to stand overnight. The resulting cake is broken up, filtered, and washed with cold 95% ethanol. The yellow solid product, 3-benzyloxy-4-ethoxy-β-nitrostyrene, is dried in vacuo at 80°C, m.p, (102°) 105°–108°C, about 50.2 g (84% yield).

B. 2-(3-Benzyloxy-4-ethoxyphenyl)-2-methoxynitroethane: A 25% sodium methoxide solution in methanol (157.7 g, 0.73 mole) is rapidly added, under nitrogen, to a stirred suspension of 3-benzyloxy-4-ethoxy1β-nitrostyrene (54.55 g, 0.1825 mole) in 300 ml of methanol previously cooled to −20°C in a dry ice-acetone bath. After stirring the reaction mixture for 4 hours between −15°C and −10°C, 46.0 g (0.7665 mole) of glacial acetic acid is added dropwise while the temperature is maintained below −15°C. After stirring for ½ hour, a dark tacky product is removed by filtration, dissolved in ether, washed with water, dried over sodium sulfate, and the solvent removed in vacuo. The filtrate is diluted with water, extracted with ether, dried over sodium sulfate and the solvent removed in vacuo. The combined residues total about 52.4 g (87%) of crude product, 2-(3-benzyloxy-4-ethoxyphenyl)-2-methoxynitroethane, which is utilized in the next step without further purification.

C. 3-Benzyloxy-4-ethoxy-β-methoxyphenethylamine fumarate: A solution of 2-(3-benzyloxy-4-ethoxyphenyl)-2-methoxynitroethane (52.4 g, 0.1583 mole) in 250 ml of freshly distilled tetrahydrofuran is added slowly to a stirred suspension of 15.2 g (0.4 mole) lithium aluminum hydride in 250 ml of tetrahydrofuran. The mixture is heated under reflux for 3 hours, then cooled to room temperature overnight. Excess lithium aluminum hydride is decomposed with ice-water, the precipitate removed by filtration, and washed well with ether. The combined organic layers are dried over potassium carbonate and the solvent removed in vacuo to yeild 41.5 g of a crude oil. The oil is dissolved in isopropanol-ethanol which is then added to an equimolar amount of fumaric acid in isopropanol. After filtration, the resultant salt is stirred in cold acetone, then recrystallized from aqueous acetone to yield the product, 3-benzyloxy-4-ethoxy-β-methoxyphenethylamine fumarate, as a white solid, m.p. (140°–160°) 161°–163°C.

D. 2-[(3-Benzyloxy-4-ethoxy-β-methoxyphenethyl)-imino]-1-methylpyrrolidine fumarate: Triethyloxonium fluoroborate is prepared, under nitrogen, from 3.11 g (0.0336 mole) of epichlorohydrin in 15 ml of ether with 6.35 g (0.0447 mole) of bornontrifluoride etherate in 40 ml of ether. After heating under reflux for 3 hours, the reaction mixture is cooled, the ether removed by decantation, and the solid residue washed three times with ether. The residue is dissolved in 30 ml of methylene chloride, treated with 3.33 g (0.0336 mole) of N-methyl-2-pyrrolidinone in 15 ml of methylene chloride, and stirred under nitrogen at room temperature overnight. A solution of 8.00 g (0.0266 mole) of 3-benzyloxy-4-ethoxy-β-methoxyphenethylamine (obtained from the fumarate salt by conventional treatment with alkali) in 50 ml methylene chloride is added and the reaction mixture stirred at room temperature overnight. The solvent is removed in vacuo and the thusobtained crude $HBF_4$ salt is converted to the free base by treatment with 3N sodium hydroxide. The base is extracted with 2:1 ether:methylene chloride, the extract washed with saturated brine, dried over anhydrous $K_2CO_3$ and the solvent removed in vacuo. The residual oily base is dissolved in isopropanol and treated with an equimolar amount of fumaric acid in the same solvent to yield the product, 2-[(3-benzyloxy-4-ethoxy-β-methoxyphenethyl)imino]-1-methylpyrrolidine fumarate. After recrystallization from isopropanol, the m.p. is 154°–156°C.

EXAMPLE XXXII

The procedure of Example XXV is followed to prepare the subject compounds of formula (I) wherein $R_3$ is loweralkyl. For example, by utilizing an equivalent amount of 1-methyl-5-pentyl-2-pyrrolidinone, and 1,3-dibutyl-2-pyrrolidinone, respectively, in place of the 1,5-dimethyl-2-pyrrolidinone used therein, and by substituting an equivalent amount of an appropriately substituted β-OR$_2$-phenethylamine of formula (III) in place of the 3,4-diethoxy-β-methoxyphenethylamine used therein, the following products are obtained in the form of the fumarate salt:

2-[(3-methyl-4-methoxy-β-methoxyphenyl)imino]-1,5-dimethylpyrrolidine;

2-[(3,4-diethoxy-β-methoxyphenyl)imino]-1-methyl-5-n-pentylpyrrolidine;

2-[(2,6-dichloro-β-methoxyphenyl)imino]-1,3-dimethylpyrrolidine;

2-[(3,4-methylenedioxy-β-methoxyphenyl)imino]-1,3-di-n-butyl-pyrrolidine;

2-[(4-benzyloxy-3-ethoxy-β-methoxyphenyl)imino]-1,5-dimethylpyrrolidine;

2-[(3,4-dimethoxy-β-hydroxyphenyl)imino]-1,5-dimethylpyrrolidine;

2-[(3-ethoxy-4-methoxy-β-hydroxyphenyl)imino]-1,3-di-n-butylpyrrolidine; and

2-[(3,4-diethoxy-β-hydroxyphenyl)imino]-1-methyl-5-n-pentylpyrrolidine.

EXAMPLE XXXIII

The hydrogenation procedure of Example XXX may be followed to transform the benzyloxy substituent on the phenyl ring of formula (I) to a hydroxy function. For example, by so hydrogenating an equivalent amount of the 2-[(4-benzyloxy-3-ethoxy-β-methoxyphenyl)imino]-1,5-dimethylpyrrolidine obtained in Example XXXII, the corresponding product, 2-[(4-hydroxy-3-ethoxy-β-methoxyphenyl)imino]-1,5-dimethylpyrrolidine, is obtained.

EXAMPLE XXXIV

A. β-(4-n-Butoxy-3-ethoxy)phenyl-β-methoxynitroethane: A slurry of 53.06 (0.2 mole) of 4-n-butoxy-3-ethoxy-ω-nitrostyrene in 2pints of anhydrous methanol is cooled to −20°C in a dry ice-methanol bath. Nitrogen gas is bubbled into the reaction mixture and a sodium methoxide solution (18.4 g; 0.8 g atom of sodium in 1 pint of methanol) is added with stirring to the styrene slurry (total addition time = 20 min.) The reaction is mixture stirred in the dry ice-methanol bath for 9 hours (temperature not above −5°C). 50.44 Grams (0.84 mole) of glacial acetic acid is then added. The reaction mixture is filtered through diatomaceous earth and the filtrate is concentrated in vacuo until NaoAc cyrstallizes. The mixture is then poured onto an ice-ether mixture. The ether layer is separated and washed with water twice. The water washings are extracted with ether. The combined ether layers are dried over anhydrous MgSO$_4$. After filtering through diatomaceous earth, the filtrate is taken to dryness in vacuo to give the product, β-(4-n-butoxy-3-ethoxy)phenyl-β-methoxynitroethane, as a crude oil. The product is triturated with methanol and cooled. Crystallization occurs and the product is collected and recrystallized from isopropanol.

B. 4-n-Butoxy-3-ethoxy-β-methoxyphenethylamine acetate: A slurry of 26 g (0.0875 mole) of β-(4-n-butoxy-3-ethoxy)phenyl-β-methoxynitroethane in 120 ml of glacial acetic acid is shaken on a Parr bomb apparatus with 2 heaping spactulafulls of Raney nickel catalyst at 59 p.s.i. for about 20 hours. The reaction mixture is then filtered through diatomaceous earth and the green filtrate is taken to dryness in vacuo to give a green oil which crystallizes upon trituration with ether. The solid product, 4-n-butoxy-3-ethoxy-β-methoxyphenethylamine acetate, is collected m.p. 80°-82°C.

C. 2-[(4-n-Butoxy-3-ethoxy-β-methoxyphenethyl)imino]-1-methylpyrrolidine fumarate hydrate: Triethyloxonium fluobroate is made by adding 5.55 g (0.06 mole) of epichlorohydrin, dissolved in anhydrous ether, to a solution of 11.35 g (0.08 mole) of borontrifluoride etherate in anhydrous ether under nitrogen, with vigorous stirring. After stirring at room temperature for 2 hours, the ether is decanted and the residue washed with fresh anhydrous ether. The residue is then dissolved in anhydrous methylene chloride. To this solution is added, dropwise and with stirring, 4.96 g (0.05 mole) of 1-methyl-2-pyrrolidinone. The reaction mixture is stirred at room temperature overnight (about 16 hours). Then 13.37 g (0.05 mole) of 4-n-butoxy-3-ethoxy-β-methoxyphenethylamine (obtained from the corresponding acetate salt by conventional treatment with alkali), dissolved in anhydrous methylene chloride is added with ice-bath cooling. The reaction mixture is stirred overnight (gradually warming to room temperature). The solvent is evaporated in vacuo leaving an oily residue of the HBF$_4$ salt which is converted to free base and then treated with fumaric acid to yield the corresponding fumarate salt (hygroscopic). The product, 2-[(4-n-butoxy-3-ethoxy-β-methoxyphenethyl)imino]-1-methyl-pyrrolidine fumarate hydrate, after recrystallization from acetone-ether has a m.p. of 81°-85°C.

EXAMPLE XXXV

This example demonstrates a procedural method of making the β-cycloalkoxy derivatives of formula (1).

A. β-Cyclopentyloxy-3,4-diethoxyphenylnitroethane: A 0.2 mole sample (47.48 g) of 3,4-diethoxy-β-nitrostyrene is added to a mixture of 64.87 g (0.6 mole) sodium cyclopenyloxide in 800 ml tetrahydrofuran (THF) at −25°C, with nitrogen bubbling through the mixture and with stirring (slowly). After addition is complete, the temperature is about −5°C and stirring is continued between −5° to 0°C for an additional 15 minutes. The mixture is quenched with 45 g (0.75 mole) of glacial acetic acid, diluted with water to 2 liters and extracted with ether. The extract is washed with water, dried over anhydrous MgSO4, filtered and taken to dryness in vacuo to yield about 64.5 g of β-cyclopentyloxy-3,4-diethoxyphenylnitroethane, m.p. 43°-5°C.

B. β-Cyclopentyloxy-3,4-diethoxyphenethylamine Hydrochloride:

To 150 ml glacial acetic acid is added 64.5 g (0.20 mole) of β-cyclopentyloxy-3,4-diethoxyphenylnitroethane with 2 teaspoons of Raney nickel catalyst. The mixture is shaken (Parr apparatus) under a starting pressure of 55 p.s.i. H$_2$ for 24 hours. After filtration of catalyst and removal of solvent in vacuo, the residue is diluted with water and washed 3 times with ether. The aqueous phase is treated with 10% NaOH and the free base, β-cyclopentyloxy-3,4-diethoxyphenethylamine, is extracted with ether and the ether extract, dried over K$_2$CO$_3$, is filtered and taken to dryness in vacuo. Addition of anhydrous HCl to the free base in ether affords the corresponding HCl acid addition salt, m.p. 125°-9°c dec.

C. 2-[(β-Cyclopentyloxy-3,4-diethoxyphenethyl)imino]-1-methylpyrrolidine 2-naphthalenesulfonate: To 9.79 g (0.069 mole) of boron trifluoride etherate in 300 ml of dry ether under dry nitrogen is added over a few seconds 5.55 g (0.06 mole) of epichlorohydrin. After stirring for 2 hrs., the ether layer is decanted and the crystalline triethyloxonium fluoborate is washed twice with fresh ether by decantation. The crystals are dissolved in 100 ml of dry $CH_2Cl_2$ and 5.95 g (0.06 mole) of 1-methyl-2-pyrrolidinone is added. After stirring for 3 hrs., 14.67 g (0.05) mole of β-cyclopentyloxy-3,4-diethoxyphenethylamine is added with cooling (under $N_2$). The mixture is allowed to stir for about 15 hours. After removal of the solvent in vacuo, the residue is dissolved in acetone and diluted with ether to yield the crystalline $HBF_4$ salt (about 19.3 g), m.p. 124°–6°C. Recrystallization from acetone-ether (1:1) gives the pure $HBF_4$ salt, m.p. 125°–7°C. Conversion to free base ($CH_2Cl_2$) in the cold (10% NaOH) yields, after drying ($K_2CO_3$) and solvent removal in vacuo, the free base as an oil which is treated in an acetone-ether (1:1) mixture with 8.82 g (0.039 mole) of 2-napthalenesulfonic acid hydrate, which is recrystallized (twice) from acetone-ether to yield the pure salt, m.p. 163°–4°C.

EXAMPLE XXXVI

The procedure of Example XXXV is repeated except that an equivalent amount of an appropriate sodium cycloalkoxide is reacted with an equivalent amount of an appropriate nitrostyrene precursor to yield the following end products (in base form):

2-[(β-cyclohexyloxy-3,4-dimethoxyphenethyl)imino]-1-methylpyrrolidine;

2-[(β-cyclopentyloxy-3-ethoxy-4-methoxyphenethyl)imino]-1-methylpyrrolidine; and 2-[(β-cyclopentyloxy-2,6-dichlorophenethyl)imino]-1-benzylpyrrolidine.

EXAMPLE XXXVII

This example demonstrates a procedural method of making the β-alkenoxy derivatives of formula (I).

A. β-Allyloxy-3,4-diethoxyphenylnitroethane: 0.50 Mole (118.63 g) of 3,4-diethoxy-β-nitrostyrene is added (under bubbling $N_2$) to a mixture of 1.5 mole (119.9 g) of sodium allyloxide in about 700 ml dry THF with stirring (slowly) at −20°C. After the addition is complete, the temperature is about −5°C and stirring is continued between −5°–0°C for 45 mins. The mixture is then quenched with 109.8 g (1.83 moles) of glacial HOAc, , diluted with ice-water and extracted with ether. The ether extract is washed with ice-water (4times), treated with saturated brine and dried over anhydrous $MgSO_4$. The mixture is filtered through diatomaceous earth and taken to dryness in vacuo. Addition of $H_2O$ to the residue and seeding affords the crystalline β-allyloxy-3,4-diethoxyphenylnitroethane which, after, after several recrystallizations from cyclohexane, has a m.p. of 56°–58°C.

B. β-Allyloxy-3,4-diethoxyphenethylamine Hydrochloride: To a solution of 28.5 g (0.75 mole) of lithium aluminum hydride in 800 ml of dry ether is added with stirring 73.7 g (0.25 mole) of β-allyloxy-3,4-diethoxyphenylnitroethane in 600 ml of dry ether through an addition funnel slowly and cautiously. The mixture is allowed to stir at room temperature for 30 minutes, refluxed with stirring for 4 hrs and then cooled in an ice-water bath. Water (28.5 ml is added cautiously followed by 28.5 ml NaOH (10%) and, with less caution, 85.5 ml water. After stirring for 30 minutes, the inorganics are filtered (diatomaceous earth) and the cake is washed with dry ether. The combined filtrates are dried over $K_2CO_2$ (anhydo) filtered (diatomaceous earth) and taken to dryness in vacuo affording the β-allyloxy-3,4-diethoxyphenethylamine base as an oil (58.3 g). Anhydrous HCl is added to the oil in ether (ice-water bath) and the resulting crystals are filtered and recrystallized twice from acetone-ether to give the pure HCl salt, m.p. (134°) 135°–6°C. dec.

C. 2-[(β-Allyloxy-3,4-diethoxyphenethyl)imino]-1-methylpyrrolidine Hexamate: To 6.24 g (0.044 mole) of boron trifluoride etherate in 300 ml of dry ether under dry $N_2$ is added over a few seconds 3.70 g (0.04 mole) of epichlorohydrin. After stirring for 2 hrs., the ether layer is decanted and the crystalline triethyloxonium fluoborate is washed twice with fresh ether by decantation. The crystals are dissolved in 100 ml of dry $CH_2Cl_2$ and 3.96 g (0.04 mole) of 1-methyl-2-pyrrolidinone is added. After stirring 3 hrs, 7.95 g (0.03 mole) of β-allyloxy-3,4-diethoxyphenethylamine is added with cooling ($N_2$). The mixture is allowed to stir over night (about 15 hours). The solvent is removed and the residue dissolved in minimal isopropanol and diluted with ether to give the crystalline $HBF_4$ salt, m.p. 78°–80°C. Conversation to free base, followed by treatment with 4.12 g (0.023 mole) of hexamic acid in isopropanol gives the corresponding cyclohexanesulfamate (hexamate) salt. Recrystallation from isopropanol-ether affords the pure product, 2-[(β-allyloxy-3,4-diethoxyphenethyl)-imino ]-1-methylpyrrolidine hexamate, m.p. 109°–11°C.

EXAMPLE XXXVIII

This example demonstrates a procedural method of making the N-hydroxyalkyl derivatives of formula (1). 2-[(3,4-Diethoxy-β-methoxyphenethyl)imino]-1-pyrrolidin-ethanol saccharinate: Triethyloxonium fluoroborate, prepared in the usual manner from 9.25 g (0.10 mole) of epichlorohydrin and 18.90 g (0.133 mole) of boron trifluoride etherate, is dissolved in 70 ml of methylene chloride, treated with 12.92 g (0.10 mole) of 2-keto-1-pyrrolidinethanol in 30 ml of methylene chloride, and the solution stirred under nitrogen at room temperature for 3 hrs. The mixture is cooled (ice-bath) and a solution of 3,4-diethoxy-β-methoxyphenethylamine (21.51g. 0.09 mole) in methylene chloride is added, and the mixture stirred at room temperature overnight (about 15 hours). The solvent is then removed in vacuo to give about 43.7 g of the crude fluoroborate salt as an oily residue. The fluoroborate salt is converted to the free base using cold 3N sodium hydroxide and extracting with ether/methylene chloride (2:1). The extracts are combined, washed with saturated brine, dried over potassium carbonate, and the solvent removed in vacuo. The residual oily 2-[(3,4-diethoxy-β-methoxyphenethyl)imino]-1-pyrrolidin-ethanol is dissolved in acetone and added to an equimolar amount of saccharin in the same solvent. Several recrystallizations from ethyl acetate-ether (1:1) affords about 16.46 g of 2-[(3,4-diethoxy-β-methoxyphenethyl)imino]-1-pyrrolidin-ethanol saccharinate as a white solid, m.p. (100) 109°–113°C.

EXAMPLE XXXIX

2-[(3,4-Diethoxy-β-methoxyphenethyl)imino]-1,4,4-trimethylpyrrolidine Saccharinate: Triethyloxonium fluoborate is prepared, under nitrogen, by adding a solution of 9.25 g (0.10 mole) of epichlorohydrin in 50 ml of ether to 18.90 g (0.133 mole) of boron trifluoride etherate in 50 ml of ether. After heating under reflux for 3 hrs, the reaction mixture is cooled, the ether removed by decantation, and the solid residue washed three times with ether. The residue is dissolved in 50 ml of methylene chloride, treated with 12.70 g (0.10 mole) of 1,4,4-trimethyl-2-pyrrolidinone in 50 ml of methylene chloride, and stirred under nitrogen at room temperature for 15 hours. The mixture is cooled (ice-bath) and a solution of 3,4-diethoxy-β-methoxyphenethylamine (20.31 g, 0.085 mole) in methylene chloride is added, and the reaction mixture stirred at room temperature for about 15 hours. The solvent is removed in vacuo and the fluoroborate salt residue is crystallized from ethanol-ether. The fluoroborate salt is converted to the free base using cold 3N sodium hydroxide and extracting twice with ether/methylene chloride (2:1). The extracts are combined, washed with saturated brine, dried over potassium carbonate, and the solvent removed in vacuo. The oily residue of 2-[(3,4-diethoxy-β-methoxyphenethyl)imino]-1,4,4-trimethylpyrrolidine is dissolved in acetone and added to an equimolar amount of saccharin in the same solvent. Recrystallizations from methanol-acetone-ether yields the product, 2-[(3,4-diethoxy-β-methoxyphenethyl)imino]-1,4,4-trimethylpyrrolidine saccharinate as a white solid, m.p. 161°–4°C.

EXAMPLE XL

A. Diethyl nonylidenemalonate: With rapid stirring a solution of 380 g (2.0 moles, 220 ml) of anhydrous titanium tetrachloride in 500 ml of carbon tetrachloride is slowly added to 3 liters of dioxane at 12°C under nitrogen, followed by a solution of nonyl aldehyde (149.1 g, 1.05 mole) and diethyl malonate (160.0 g, 1.0 mole) in 500 ml of dioxane. The reaction mixture is cooled to 0°C, and a solution of 320 ml (316 g, 4.0 mole) of dry pyridine in 900 ml of dioxane is added dropwise over a period of 1 hr. The reaction mixture is allowed to come to room temperature slowly overnight. The stirring is continued for 24 hrs. The reaction mixture is diluted with 2 liters of water, and extracted three times with ether. The ether extracts are combined, washed three times with water, and dried over magnesium sulfate. The solvent is removed in vacuo, and the residue distilled to give 201.3 g (71%) of diethyl nonylidenemalonate as a clear liquid collected between 140°–145°C/0.3 mm.

B. Ethyl 2-carbethoxy-3-nitromethylundecanoate: A mixture of 201.3 g (0.71 mole) of diethyl nonylidenemalonate, 216 g (3.55 mole) of nitromethane, and 20.70 g (0.18 mole) of 1,1,3,3,-tetramethylguanidine is stirred at room temperature for 3 days. The reaction mixture is then diluted with ether, washed four times with 700 ml portions of 1N of hydrogen chloride, dried over magnesium sulfate, and the solvent removed in vacuo to give about 257 g of crude material. A small sample, purified by distillation, affords an amber oil collected at 180°C/0.3 mm with some decomposition. The NMR is consistent with the expected product, ethyl 2-carbethoxy-3-nitromethylundecanoate.

C. 3-Carbethoxy-4-n-octyl-2-pyrrolidinone: A mixture of 230 g (0.667 mole) of ethyl-2-carbethoxy-3-nitromethyl-undecanoate in 600 ml of absolute ethanol is hydrogenated on a Parr shaker over Raney nickel catalyst at 60°–70°C for 48 hrs. The catalyst is filtered off, the filtrate stirred with activated charcoal and again filtered, and the solvent removed in vacuo to given 170 g. of 3-carbenthoxy-4-n-octyl-2-pyrrolidinone, the NMR and infra-red (I.R.) of which are consistent with the expected product.

D. 4-n-Octyl-2-pyrrolidinone: A solution of 115 g (2.04 mole) of potassium hydroxide in 800 ml of 95% ethanol is added to a solution of 137.0 g (0.51 mole) of 3-carbethoxy-4-n-octyl-2-pyrrolidinone in 700 ml of ethanol. The mixture is heated under reflux for 10 hours and stirred overnight (about 15 hours). The reaction mixture is cooled (ice-bath) and carefully acidified with concentrated hydrochloric acid to pH 3.5. The inorganics which precipitate are separated by filtration and washed once with chloroform and ethanol. The combined filtrate and washings are concentrated in vacuo to give about 183 g of 4-n-octyl-2-pyrrolidinone-3-carboxylic acid as a dark oil. The acid is dissolved in p-cymene and heated under reflux for several hours. The solvent is removed by distillation and the residue distilled twice to give about 28.32 g. of 4-n-octyl-2-pyrrolidinone as a waxy solid collected between 140°–165°c/0.05 mm, the NMR of which is consistent with the expected product.

E. 1-Methyl-4-octyl-2-pyrrolidinone: A solution of 52.0 g (0.264 mole) of 4-n-octyl-2-pyrrolidinone in 300 ml of benzene is added to a stirred suspension of 11.51 g (0.264 mole) of 57% sodium hydride (washed twice with benzene). The mixture is heated under reflux for 1 hr., cooled to room temperature, and 71.0 g (0.5 mole) of iodomethane in benzene is added. The mixture is heated under reflux for 5 hrs., and stirred at room temperature overnight. Water (200 ml) is added and the mixture stirred for ½ hr. The aqueous layer is separated and washed with benzene. The combined organic layers are dried over magnesium sulfate, the solvent removed in vacuo, and the residue distilled to give about 22.95 g of 1-methyl-4-n-octyl-2-pyrrolidinone as a slightly amber oil.

F. 2-[(3,4-Diethoxy-β-methoxyphenethyl)imino]-1-methyl-4-octylpyrrolidine saccharinate: Triethyloxonium fluoroborate, made in the usual manner using 4.63 g (0.05 mole) of epichlorohydrin and 9.47 (0.067 mole) of boron trifluoride etherate is dissolved in 50 ml of methylene chloride and treated with a solution of 10.55 g (0.05 mole) of 1-methyl-4-n-octyl-2-pyrrolidinone in 50 ml of methylene chloride. The reaction mixture is stirred under nitrogen at room temperature overnight. The mixture is cooled (ice-bath) and a solution of 10.70 g (0.045 mole) of 3,4-diethoxy-β-methoxyphenethylamine in methylene chloride is added. Stirring is continued at room temperature overnight. The reaction mixture is filtered and the solvent removed in vacuo to afford the fluoroborate salt as an oily residue. The fluoroborate salt is converted to the free base using cold 3N sodium hydroxide and extracting with ether/methylene chloride (2:1). The extracts are combined, washed with saturated brine, dried over potassium carbonate, and the solvent removed in vacuo. The resulting oil is dissolved in acetone and treated with an equimolar amount of saccharin in the same solvent. The saccharinate salt is removed and dissolved in methylene chloride, washed three times with water, dried over magnesium sulfate, and the solvent removed in vacuo. The residue is crystallized twice from acetone-ether-hexane (1:1:1) and after trituration with refluxing hexane affords the product 2-[(3,4-diethoxy-β-methoxyphenethyl)imino]-1-methyl-4-n-octylpyrrolidine saccharinate, as a white solid, m.p. 95°–98°C.

EXAMPLE XLI

A. β, 2,4,5-Tetramethoxyphenylnitroethane: To a stirring suspension of 36.1 g (0.15 mole) of 2,4,5,-trimethoxy-β-nitrostyrene in 500 ml of absolute methanol at −35°C (MeOH-dry ice bath) under N₂ is added 99 g of methanolic NaOMe (25%). The mixture is allowed to stir under N₂ for 4 hrs at -5°C. The mixture is then quenched with 29.8 g (0.49 mole) of glacial HOAc to yield crystalline β, 2,4,5-tetramethoxyphenylnitroethane, m.p. 124°–5°C. (recrystallized twice from methanol).

B. β, 2,4,5-Tetramethoxyphenethylamine acetate: A sample of 16.60 g (0.061 mole) of β, 2,4,5-tetramethoxyphenylnitroethane in 200 ml of glacial HOAc with 2 teaspoons of Raney nickel catalyst is shaken on a Parr hydrogenator under a starting pressure of 60 p.s.i. for 15.5 hrs. Removal of catalyst, evaporation of solvent to dryness in vacuo and addition of ether to the residue with cooling yields crystals of the crude salt. Recrystallization from isopropanolether (1:1) affords the pure product, β,2,3,4-tetramethoxyphenethylamine acetate, m.p. (127°) 129°–30°C, which is converted to the free base by standard treatment with alkali (NaOH).

C. 1-Methyl-2-(β,2,4,5-tetramethoxyphenethyl)-iminopyrrolidine fumarate: To 7.81 g (0.055 mole) of boron trifluoride etherate in 500 ml of dry ether under nitrogen is added over 1 min 4.63 g (0.05 mole) of epichlorohydrin. After stirring for 2 hrs., the ether layer is decanted and the crystalline triethyloxonium fluoroborate is washed twice with fresh ether by decantation. The crystals are dissolved in 100 ml of dry CH₂Cl₂ and 4.96 g (0.05 mole) of 1-methyl-2-pyrrolidinone is added. After stirring 3 hrs., 9.44 g (0.04 mole) of β, 2,-4,5-tetramethoxyphenethylamine is added with cooling (under N₂). The mixture is allowed to stir for about 15 hours. Removal of solvent in vacuo, followed by trituration with ether (cooling) gives about 12.29 g of the fluoroborate salt as crystals: m.p. 99°–104°C dec. Standard conversion to the free base and subsequent treatment with 1.5 equivalents of fumaric acid gives the sesquifumarate salt, m.p. 175°–177.5°C. dec.

EXAMPLE XLII

By repeating the procedure of Example IV, except that an equivalent amount of:

1,3-di-n-butyl-2-pyrrolidinone,
3,3-di-n-butyl-1-methyl-2-pyrrolidinone,
1,3,5-trimethyl-2-pyrrolidinone,
1,3,3,-trimethyl-2-pyrrolidinone, and
5-n-hexyl-1-methyl-2-pyrrolidinone, is used in place of the N-methyl-2-pyrrolidinone used therein, the following respective products are obtained in the form of the free base, which are then converted to the fumarate acid addition salt:

2-(3,4-diethoxy-β-methoxyphenethyl)imino-1,3-di-n-butylpyrrolidine,
2-(3,4-diethoxy-β-methoxyphenethyl)imino-3,3-di-n-butyl-1-methylpyrrolidine,
2-(3,4-diethoxy-β-methoxyphenethyl)imino-1,3,5-trimethylpyrrolidine,
2-(3,4-diethoxy-β-methoxyphenethyl)imino-1,3,3-trimethylpyrrolidine, and
2-(33,4-diethoxy-β-methoxyphenethyl)imino-5-n-hexyl-1-methylpyrrolidine.

I claim:

1. A compound selected from the group consisting of a 2-imino-pyrrolidine having the formula:

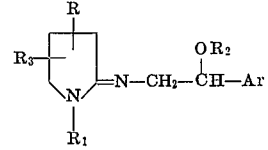

wherein

Ar is a substituted phenyl selected from the group consisting of di-loweralkoxyphenyl, tri-loweralkoxyphenyl, loweralkyl-loweralkoxyphenyl, hydroxy-loweralkoxyphenyl, benzyloxy-loweralkoxyphenyl, di-halophenyl and methylenedioxyphenyl;

R is a member selected from the group consisting of hydrogen and alkyl having 1 to 8 carbons;

R₁ is a member selected from the group consisting of loweralkyl, hydroxy-loweralkyl and benzyl;

R₂ is a member selected from the group consisting of hydrogen, loweralkyl, loweralkenyl, cyclopentyl and cyclohexyl;

R₃ is a member selected from the group consisting of hydrogen and loweralkyl; and the therapeutically active non-toxic acid addition salts thereof; provided that, (i) when said R₁ is benzyl, then said R₂ is loweralkyl and said R and R₃ are each hydrogen, and (ii) when said Ar is hydroxy-loweralkoxyphenyl, then said R₁ is loweralkyl.

2. A compound selected from the group consisting of a 2-imino-pyrrolidine having the formula:

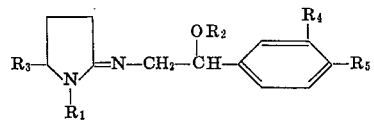

and the therapeutically active non-toxic acid addition salts thereof wherein R₁ is a member selected from the group consisting of loweralkyl and benzyl; R₂ is a member selected from the group consisting of hydrogen and loweralkyl; R₃ is a member selected from the group consisting of hydrogen and loweralkyl; and either of R₄ and R₅ is loweralkoxy, the other being a member selected from the group consisting of loweralkoxy, loweralkyl, hydroxy and benzyloxy; provided that, (i) when said R₁ is benzyl, then said R₂ is loweralkyl and said R₃ is hydrogen, and (ii) when either of said R₄ and R₅ is hydroxy, then said R₁ is loweralkyl.

3. A compound selected from the group consisting of a 2-imino-pyrrolidine having the formula:

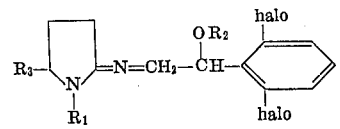

and the therapeutically active non-toxic acid addition salts thereof wherein $R_1$ is a member selected from the group consisting of loweralkyl and benzyl; $R_2$ is a member selected from the group consisting of hydrogen and loweralkyl; and $R_3$ is a member selected from the group consisting of hydrogen and loweralkyl; provided that, when said $R_1$ is benzyl, then said $R_2$ is loweralkyl and said $R_3$ is hydrogen.

4. A compound of claim 3 wherein halo is chloro.

5. A compound selected from the group consisting of a 2-imino-pyrrolidine having the formula:

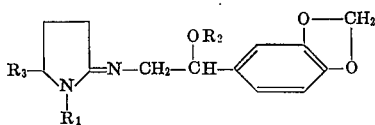

and the therapeutically active non-toxic acid addition salts thereof wherein $R_1$ is a member selected from the group consisting of loweralkyl and benzyl; $R_2$ is a member selected from the group consisting of hydrogen and loweralkyl; $R_3$ is a member selected from the group consisting of hydrogen and loweralkyl; provided that, when said $R_1$ is benzyl, then said $R_2$ is loweralkyl and said $R_3$ is hydrogen.

6. A compound selected from the group consisting of 2-(3,4-dimethoxy-β-methoxy-β-phenethyl)imino-1-methylpyrrolidine and the therapeutically active non-toxic acid addition salts thereof.

7. A compound selected from the group consisting of 1-benzyl-2-(3,4-diethoxy-β-methoxy-β-phenethyl-)iminopyrrolidine and the therapeutically active non-toxic acid addition salts thereof.

8. A compound selected from the group consisting of 2-(3,4-dimethoxy-β-hydroxy-β-phenethyl)imino-1-methylpyrrolidine and the therapeutically active non-toxic acid addition salts thereof.

9. A compound selected from the group consisting of 2-(3,4-diethoxy-β-methoxy-β-phenethyl)imino-1-methylpyrrolidine and the therapeutically active non-toxic acid addition salts thereof.

10. A compound selected from the group consisting of 2-(3,4-diethoxy-β-phenethyl)imino-1-methylpyrrolidine and the therapeutically active non-toxic acid addition salts thereof.

11. A compound selected from the group consisting of 2-(4-ethoxy-3,β-dimethoxy-β-phenethyl)imino-1-methylpyrrolidine and the therapeutically active non-toxic acid addition salts thereof.

12. A compound selected from the group consisting of 1-n-butyl-2-(3,4-diethoxy-β-methoxyphenethyl-)iminopyrrolidine and the therapeutically active non-toxic acid addition salts thereof.

13. A compound selected from the group consisting of (+) -2-(3,4-diethoxy-β-methoxyphenethyl)imino-1-methylpyrrolidine and the therapeutically active non-toxic acid addition salts thereof.

14. A compound selected from the group consisting of (−) -2-(3,4-diethoxy-β-methoxyphenethyl)imino-1-methylpyrrolidine and the therapeutically active non-toxic acid addition salts thereof.

15. A compound selected from the group consisting of 1-methyl-2-(β,3,4-triethoxyphenethyl)-iminopyrrolidine and the therapeutically active non-toxic acid addition salts thereof.

16. A compound selected from the group consisting of 1-methyl-2-(β,2,4-trimethoxyphenethyl)-iminopyrrolidine and the therapeutically active non-toxic acid addition salts thereof.

17. A compound selected from the group consisting of 2-(4-methoxy-3-methyl-β-methoxyphenethyl)-imino-1-methylpyrrolidine and the therapeutically active non-toxic acid addition salts thereof.

18. A compound selected from the group consisting of 2-[(3,4-diethoxy-β-methoxyphenethyl)imino]-1,5-dimethylpyrrolidine and the therapeutically active non-toxic acid addition salts thereof.

19. A compound selected from the group consisting of 2-[(3,4-methylenedioxy-β-methoxyphenethyl)imino]-1-methylpyrrolidine and the therapeutically active non-toxic acid addition salts thereof.

20. A compound selected from the group consisting of 2-[(2,6-dichloro-β-methoxyphenethyl)imino]-1-methylpyrrolidine and the therapeutically active non-toxic acid addition salts thereof.

21. A compound selected from the group consisting of 2-(3-ethoxy-β,4-dimethoxyphenethyl)imino-1-methylpyrrolidine and the therapeutically active non-toxic acid addition salts thereof.

22. A compound selected from the group consisting of 2-(4-benzyloxy-3-ethoxy-β-methoxyphenethyl)-imino-1-methylpyrrolidine and the therapeutically active non-toxic acid addition salts thereof.

23. A compound selected from the group consisting of 2-(3-ethoxy-4-hydroxy-β-methoxyphenethyl)imino-1-methylpyrrolidine and the therapeutically active non-toxic acid addition salts thereof.

24. A compound selected from the group consisting of 2-[(3-benzyloxy-4-ethoxy-β-methoxyphenethyl)imino]-1-methylpyrrolidine and the therapeutically active non-toxic acid addition salts thereof.

25. A compound selected from the group consisting of 2-[(4-n-butoxy-3-ethoxy-β-methoxyphenethyl)imino]-1-methylpyrrolidine and the therapeutically active non-toxic acid addition salts thereof.

* * * * *

UNITED STATES PATENT AND TRADEMARK OFFICE
CERTIFICATE OF CORRECTION

PATENT NO. : 3,876,658
DATED : April 8, 1975
INVENTOR(S) : Rasmussen

It is certified that error appears in the above-identified patent and that said Letters Patent are hereby corrected as shown below:

In Column 1, line 30, that portion of the formula reading

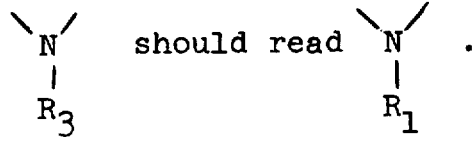

In Column 5, line 3, "text" should read -- test --.
In Column 5, line 61, "XVIII" should read -- XVII --.
In Column 9, line 12, "62" (both instances) should read -- β --.
In Column 9, line 23, "-62" should read -- -β --.
In Column 9, line 41, delete the word "thick".
In Column 10, line 4, "finally ml." should read -- finally 111 ml. --.
In Column 10, line 20, "-62" should read -- -β --.
In Column 10, line 26, "9094°C." should read -- 90-94°C. --.
In Column 11, line 62, "ther" should read -- ether --.
In Column 11, line 67, "CaCl$_2$" should read -- (CaCl$_2$ --.
In Column 12, line 53, "CaCl$_2$ tube)" should read -- (CaCl$_2$ tube) --.
In Column 12, line 54, insert -β before -methoxyphenethylamine.
In Column 13, line 9, "rude" should read -- crude --.
In Column 14, line 45, "-+-" should read --ω'--.
In Column 21, line 64, "ethoxy 1 β" should read -- ethoxy- β --.
In Column 22, line 2, "-15°C." should read -- -5°C.--.
In Column 22, line 67, after 1-methyl-5-pentyl-2-pyrrolidinone, insert -- 1,3-dimethyl-2-pyrrolidinone, --.
In Column 29, line 12, after -5°C. insert -- to 0°C. --.
In Column 30, line 3, the portion of the formula reading " (33,4 " should read -- (3,4 --.
In Column 30, line 65, the portion of the formula reading "=N=" should read -- =N- --.
In Column 31, line 46, "2-(3,4-diethoxy-β-phenethyl)" should read-- 2-(3,4-diethoxy- β-hydroxy- β-phenethyl) --.

Signed and Sealed this

Twenty-fifth Day of January 1977

[SEAL]

Attest:

RUTH C. MASON
Attesting Officer

C. MARSHALL DANN
Commissioner of Patents and Trademarks